US012700944B2

(12) United States Patent
Thyni et al.

(10) Patent No.: US 12,700,944 B2
(45) Date of Patent: Aug. 4, 2026

(54) FRONTHAUL NETWORK UNITS AND METHODS THEREIN FOR SYNCHRONIZATION OVER A SINGLE OPTICAL FIBER IN A FRONTAHUL NETWORK

(71) Applicant: Telefonaktiebolaget LM Ericsson (publ), Stockholm (SE)

(72) Inventors: Tomas Thyni, Järfälla (SE); Mats Forsman, Rönninge (SE); Stefano Ruffini, Rome (IT); Mara Cosentino, Genoa (IT); Riccardo Ceccatelli, San Miniato (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 141 days.

(21) Appl. No.: 18/027,513

(22) PCT Filed: Oct. 16, 2020

(86) PCT No.: PCT/SE2020/050992
§ 371 (c)(1),
(2) Date: Mar. 21, 2023

(87) PCT Pub. No.: WO2022/081055
PCT Pub. Date: Apr. 21, 2022

(65) Prior Publication Data
US 2023/0379075 A1 Nov. 23, 2023

(51) Int. Cl.
*H04J 14/02* (2006.01)
*H04Q 11/00* (2006.01)

(52) U.S. Cl.
CPC ...... *H04J 14/0256* (2013.01); *H04Q 11/0062* (2013.01); *H04Q 2011/0064* (2013.01)

(58) Field of Classification Search
CPC ............. H04J 14/0256; H04Q 11/0062; H04Q 2011/0064
See application file for complete search history.

(56) References Cited

U.S. PATENT DOCUMENTS

| | | | |
|---|---|---|---|
| 6,925,263 B2 * | 8/2005 | Horne | H04J 14/0247 398/31 |
| 10,541,774 B1 * | 1/2020 | Dai | H04B 10/272 |

(Continued)

FOREIGN PATENT DOCUMENTS

| | | |
|---|---|---|
| EP | 2528254 A1 | 11/2012 |
| WO | 2012161581 A1 | 11/2012 |
| WO | 2020075318 A1 | 4/2020 |

OTHER PUBLICATIONS

International Search Report and Written Opinion of the International Searching Authority, PCT/SE2020/050992, mailed Jul. 9, 2021, 12 pages.

(Continued)

*Primary Examiner* — Pranesh K Barua
(74) *Attorney, Agent, or Firm* — Sage Patent Group

(57) ABSTRACT

A method performed by second fronthaul network unit for enabling synchronization with a first fronthaul network unit over a first single optical fiber in a fronthaul network is provided. The method includes receiving a first optical signal on the single optical fiber; and separating the received first optical signal into a second optical signal carrying downlink, DL, radio data traffic having a first optical wavelength and a third optical signal carrying packet-based synchronization messages having a second optical wavelength. The method further includes outputting the separated second optical signal towards a first optical port in the second fronthaul network unit; and splitting the separated third optical signal towards a second optical port in the second fronthaul network unit. A second fronthaul network (Continued)

unit, and a first fronthaul network unit and method therein are also provided.

16 Claims, 14 Drawing Sheets

(56)                    References Cited

U.S. PATENT DOCUMENTS

| 2006/0209711 A1* | 9/2006 | Kerpez | H04B 10/0795 |
| | | | 370/252 |
| 2007/0177873 A1* | 8/2007 | Hyun | H04J 14/0226 |
| | | | 398/72 |
| 2014/0199072 A1* | 7/2014 | Nuijts | H04J 3/0682 |
| | | | 398/75 |
| 2014/0341593 A1* | 11/2014 | van Veen | H04B 10/272 |
| | | | 398/201 |
| 2018/0234200 A1* | 8/2018 | Bottari | H04J 14/0204 |

OTHER PUBLICATIONS

Han, Liuyan et al., "First National High-Precision Time Synchronization Network with Sub-Microsecond Accuracy over Commercial Optical Networks for Wireless Applications," 2014 Asia Communications and Photonics Conference (ACP), OSA, Nov. 11, 2014, 4 pages.

International Telecommunication Union, "Precision time protocol telecom profile for phase/time synchronization with full timing support from the network," ITU-T, G.8275.1/Y.1369.1 (Mar. 2020), Telecommunication Standardization Sector of ITU; Series G: Transmission Systems and Media, Digital Systems and Networks; Packet over Transport aspects—Synchronization, quality and availability targets; Series Y: Global Information Infrastructure, Internet Protocol Aspects, Next-Generation Networks, Internet of Things and Smart Cities; Internet protocol aspects transport.

IEEE Instrumentation and Measurement Society, IEEE Standard for a Precision Clock Synchronization Protocol for Networked Measurement and Control Systems; IEEE Std 1588 (Revision of IEEE Std 1588-2002), Jul. 24, 2008, 228 pages.

* cited by examiner

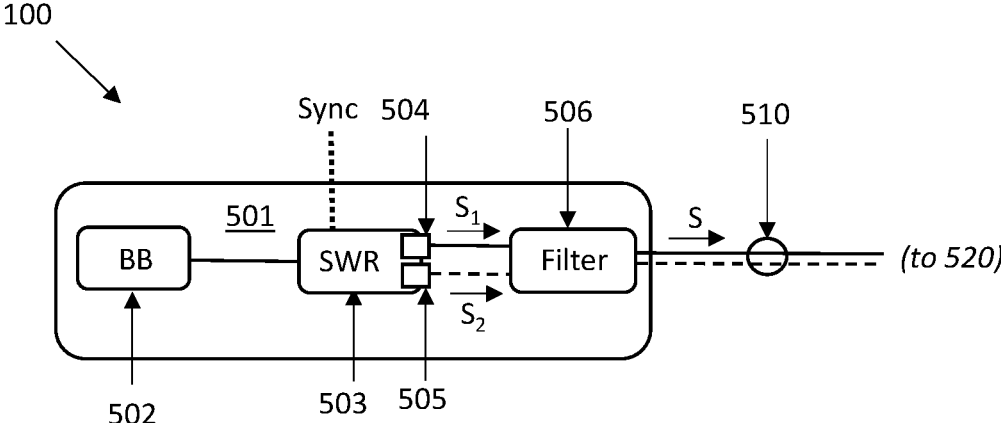
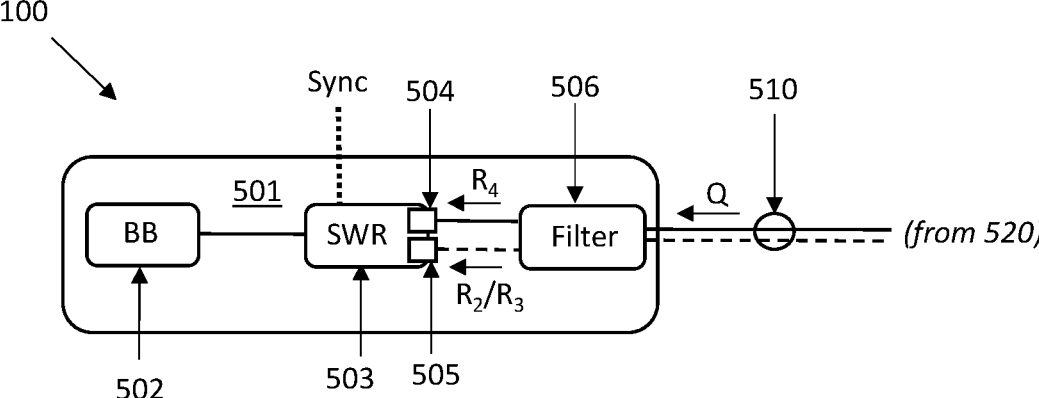
FIG. 10

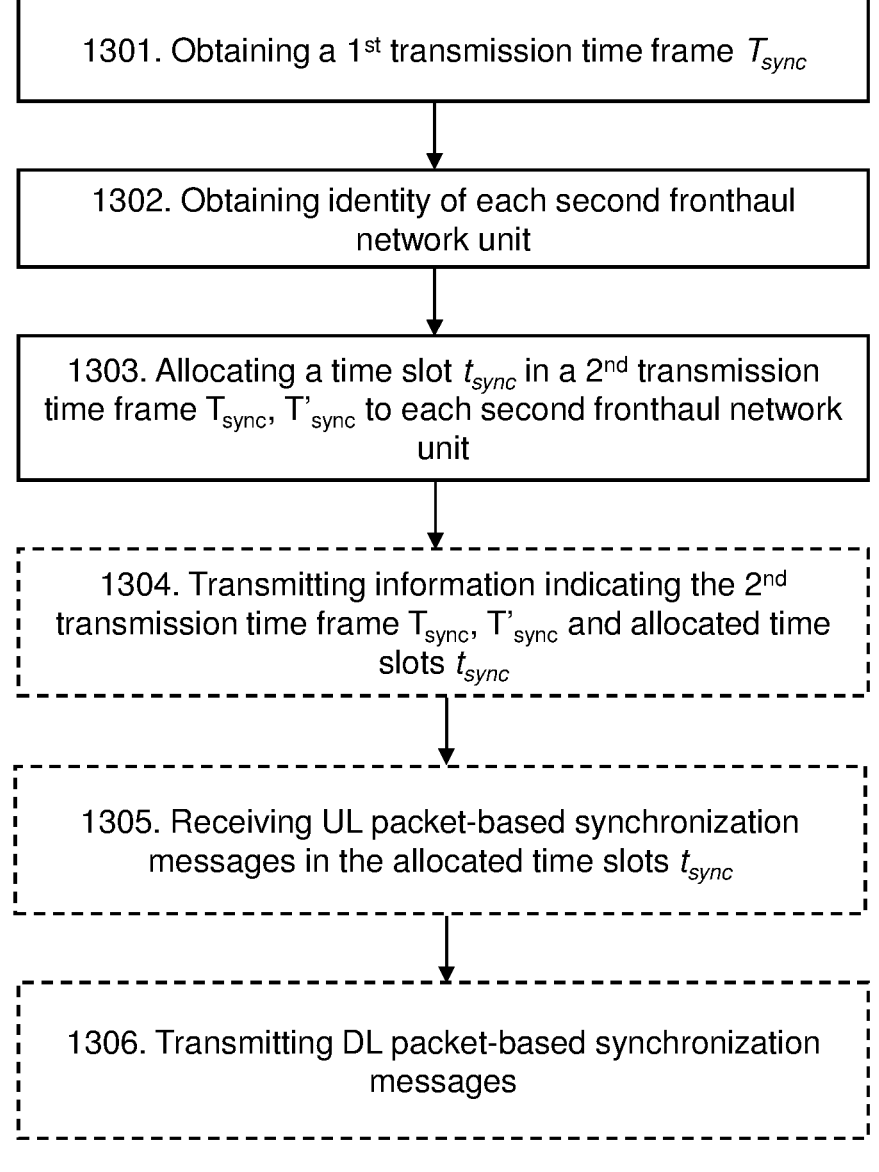

1301. Obtaining a 1$^{st}$ transmission time frame $T_{sync}$

1302. Obtaining identity of each second fronthaul network unit

1303. Allocating a time slot $t_{sync}$ in a 2$^{nd}$ transmission time frame $T_{sync}$, $T'_{sync}$ to each second fronthaul network unit 1304. Transmitting information indicating the 2$^{nd}$ transmission time frame $T_{sync}$, $T'_{sync}$ and allocated time slots $t_{sync}$ 1305. Receiving UL packet-based synchronization messages in the allocated time slots $t_{sync}$ 1306. Transmitting DL packet-based synchronization messages

FIG. 13

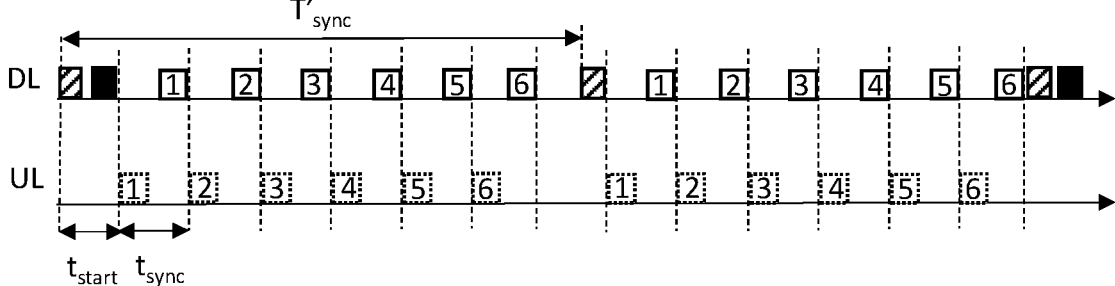
FIG. 15
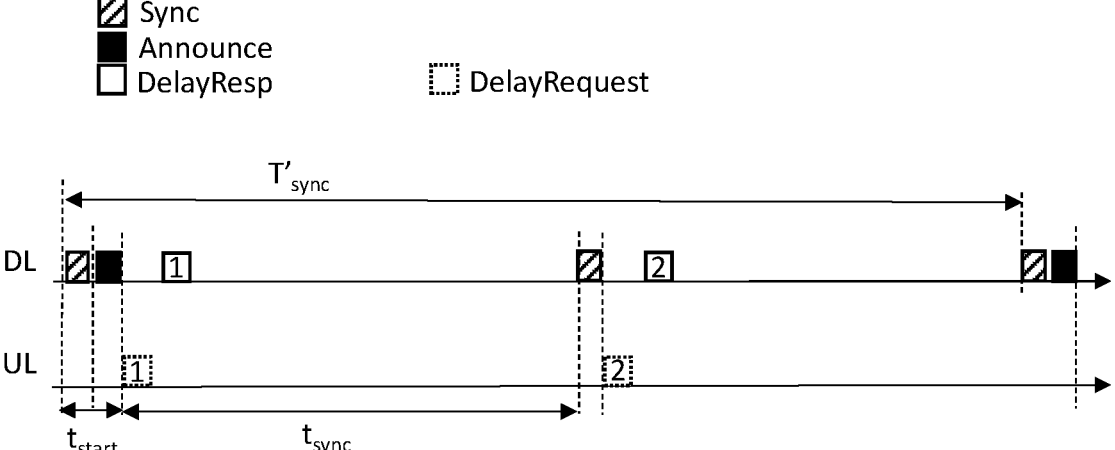
FIG. 16

FRONTHAUL NETWORK UNITS AND METHODS THEREIN FOR SYNCHRONIZATION OVER A SINGLE OPTICAL FIBER IN A FRONTAHUL NETWORK

CROSS REFERENCE TO RELATED APPLICATIONS

This application is a 35 U.S.C. § 371 national stage application of PCT International Application No. PCT/SE2020/050992 filed on Oct. 16, 2020, the disclosure and content of which is incorporated by reference herein in its entirety.

TECHNICAL FIELD

Embodiments herein relate to synchronization in a communications network. In particular, embodiments herein relate to fronthaul network units and methods therein for enabling synchronization over a single optical fiber in a fronthaul network. Further, the embodiments herein also relate to a computer program and a carrier.

BACKGROUND

In today's wireless communications networks a number of different technologies are used, such as New Radio (NR), Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for wireless communication. A wireless communications network commonly comprises network nodes, or radio base stations, providing radio coverage over at least one respective geographical area forming a cell. This is commonly referred to as an fronthaul network or Radio Access Network, RAN. Wireless devices, User Equipments (UEs), mobile stations, and/or wireless terminals, are served in the cells by the respective radio base station and are communicating with respective radio base station in the RAN over an air/radio interface. The RAN is in turn commonly connected to the core network in the wireless communications network via a so-called backhaul network. The wireless devices transmit data over the air/radio interface to the radio base stations in uplink, UL, transmissions and the radio base stations transmit data over the air/radio interface to the wireless devices in downlink, DL, transmissions.

In one type of fronthaul network, the RAN may comprise centralized baseband, BB, processing units/nodes serving one or more Radio Units, RUs, which also may be referred to as Radio Frequency, RF, processing units/nodes. The one or more RUs may, for example, be standalone remote radio units, such as, e.g. Remote Radio Heads, RRHs. The RUs may also, for example, be installed at remote cell sites that may be located up to tens of kilometers away from its corresponding digital or baseband processing unit, or be close, but spread out and distributed across an indoor environment to ensure large data traffic capacity. This type of RAN may commonly be referred to as a fronthaul network.

The fronthaul network units in a fronthaul network may be connected via optical communications links and intermediate network switches. A fronthaul network typically has rather strict latency requirements, such as, typically below 100 µs total latency including propagation delay and any delay in the intermediate network switches. For 2G/3G/4G wireless communications network, the fronthaul network has typically been implemented using the Common Public Radio Interface, CPRI. CPRI uses time division multiplexing and has built-in synchronization capabilities. The accuracy of the synchronization of fronthaul network units may be measured via a Timing Alignment Error, TAE. The TAE depends on the type of services supported by the fronthaul network. The most advanced services, such as, e.g. spatial multiplexing or transmit diversity, may require a TAE below ±65 ns, while less advanced services, such as, e.g. LTE Time Division Duplexing, LTE-TDD, may work with a TAE below ±1.5 µs. However, localization features, such as, e.g. Observed Time Difference of Arrival, OTDOA, may introduce even stricter requirement on the TAE.

Recently, a packet-based fronthaul network specification, eCPRI, has been developed to improve scalability for 4G/5G fronthaul networks. This specification suggests in IEEE 1588-2008—*IEEE Standard for a Precision Clock Synchronization Protocol for Networked Measurement and Control Systems with the ITU-T Telecom Profile* that a Precision Time Protocol, PTP, for synchronization of the remote radio units be used. Using this protocol avoids the need for costly Global Navigation Satellite System, GNSS, receivers in every RU, which otherwise may be a requirement. This also has further advantages since GNSS receivers does not work well for indoor RUs.

This PTP protocol, or other similar packet-based synchronization protocols, may be used to synchronize fronthaul network units across a fronthaul network. These protocols rely on exchanging timestamped messages and tracking the deviation between a master or reference clock and a slave clock. In an end-to-end measurement mode, the clock adjustment value in PTP may be derived from timestamps exchanged using these packet-based synchronization messages e.g.:

Sync-message. Transmitted from master unit to slave unit. Multiple Sync-messages may be transmitted prior to a Delay request message.

Follow-up-message. Transmitted from master unit to slave unit. This is an optional message that depends on the hardware timestamping capabilities of the PTP master.

Delay request message. Transmitted from slave to master.

Delay response message. Transmitted from master to slave.

FIG. 1 shows one example of a PTP exchange between a master clock unit and a slave clock unit. Here, the PTP exchange is concluded when the slave clock unit has access to four timestamps ($t_1$, $t_2$, $t_3$, $t_4$). After a Sync message is delivered, the slave clock unit will have $t_1$, $t_2$. $t_3$ is registered when the Delay_req message departs the slave, and $t_4$ will be registered by the master clock unit on receipt of the Delay_req message. The Delay_resp message carries $t_4$ back to the slave. The slave clock unit may then e.g. filter the timestamps in order to recalculate an offset value and discipline its oscillator, i.e. synchronize its clock and frequency information.

Some of the main issues to control when using the PTP protocol are Packet Delay Variation, PDV, and network asymmetry. These issues occurs because the time to traverse the fronthaul network and the network switches therein may vary between the PTP packets. The PDV and network asymmetry in a fronthaul network may depend on a number of factors, such as, for example, the load in the fronthaul network (e.g. in case routers or switches are not able to process the PTP event messages), the number of hops between the baseband processing unit (even though having only a few routers/switches using coherent optics also may introduce additional inaccuracies in the network) and the RUs, and the availability of specific fronthaul network features, such as, e.g. packet pre-emption. It should also be noted that PDV may occur even if synchronization/timing messages have strictly higher priority in the fronthaul network than fronthaul data packets. This is because, due to store-and-forward operation in e.g. IEEE 802.3-compliant switches, data packets that are already being transmitted in the outbound link are not considered when deciding which data packet should be transmitted next.

FIG. 2 shows one example of packet-switched or routed RAN comprising a fronthaul network that may use the PTP protocol of IEEE 1588 for synchronization. Here, a baseband, BB, processing unit is connected to a central packet forwarding equipment, e.g. a Switch or Router, SWR. The central SWR may receive sync input from the PTP protocol of IEEE 1588. The central SWR is further connected in series to several further SWRs, which in turn are each connected to a radio unit, RU. This fronthaul network illustrates a conventional way of performing packet synchronization by distributing the sync traffic as packets in a packet network by e.g. using the PTP protocol of IEEE 1588. While using a packet network will provide a good statistical multiplexing for the RAN data traffic, the PDV for the packets may become too large, since every SWR will perform sync accuracy measurements and adaptation and thus introduce sync inaccuracies that will add up and become larger for each hop.

As shown in FIG. 3, an alternative way of performing packet synchronization, e.g. using PTP IEEE 1588, in a packet-based fronthaul network is to provide a Point-to-Point connection between each RU and the BB processing unit. This may be performed by having separate and dedicated physical fibers arranged towards every RU or by using a dedicated optical wavelength towards each of the RUs. While this setup may provide a good sync accuracy, it will require multiple connections and/or fibers to be rolled out. In addition, it will also require several expensive high capacity switch ports (in case of using fiber connections) or more complex coloured optics (in case of using dedicated wavelengths) to be implemented in the central SWR.

Here, as shown in FIG. 4, an option is to use Passive Optical Networking, PON, to connect the multiple RUs, i.e. Optical Network Units, ONUs, point-to-point with the BB processing unit, i.e. an Optical Line Terminal, OLT, over a single fiber using the same channel, i.e. over an Optical Distribution Network, ODN. Here, the RAN data traffic and the sync traffic towards the first RU is transmitted on a dedicated wavelength that is filtered out only towards the first RU (as illustrated by the dotted line in FIG. 4). Similarly, the RAN data traffic and the sync traffic towards the second and third RU are also transmitted together on separate dedicated wavelengths that are filtered out only towards its respective second or third RU (as illustrated by the dashed and fully-drawn line in FIG. 4). While this setup will provide an even better sync accuracy and not require multiple connections, it will still require several expensive high capacity switch ports and more complex coloured optics to be implemented in the central SWR. Also, the bandwidth offered in the PON network setup may not always satisfy the data traffic needs in the network.

Therefore, with increasing implementation of high capacity and low latency communication networks, there is an increased need for high accurate timing in the fronthaul network parts, such as, a fronthaul network, of a communications network and consequently a high accuracy in sync distribution; while also keeping implementation cost and network complexity as low as possible. Hence, there is a need to improve synchronization in fronthaul networks.

SUMMARY

It is an object of embodiments herein to improve synchronization in a fronthaul network.

According to a first aspect of embodiments herein, the object is achieved by a method performed by a second fronthaul network unit for enabling synchronization with a first fronthaul network unit over a first single optical fiber in a fronthaul network. The second fronthaul network unit receives a first optical signal on the single optical fiber. Also, the second fronthaul network unit separates the received first optical signal into a second optical signal carrying downlink, DL, radio data traffic having a first optical wavelength and a third optical signal carrying packet-based synchronization messages having a second optical wavelength, wherein the second optical wavelength is different from the first optical wavelength. Further, the second fronthaul network unit outputs the separated second optical signal towards a first optical port in the second fronthaul network unit. Furthermore, the second fronthaul network unit splits the separated third optical signal towards a second optical port in the second fronthaul network unit.

According to a second aspect of embodiments herein, the object is achieved by a second fronthaul network unit for enabling synchronization with a first fronthaul network unit over a first single optical fiber in a fronthaul network. The second fronthaul network unit is configured to receive a first optical signal on the single optical fiber. The second fronthaul network unit is also configured to separate the received first optical signal into a second optical signal carrying DL radio data traffic having a first optical wavelength and a third optical signal carrying packet-based synchronization messages having a second optical wavelength, wherein the second optical wavelength is different from the first optical wavelength. The second fronthaul network unit is further configured to output the separated second optical signal towards a first optical port in the second fronthaul network unit. Further, the second fronthaul network unit is configured to split the separated third optical signal towards a second optical port in the second fronthaul network unit.

According to a third aspect of embodiments herein, the object is achieved by a method performed by a first fronthaul network unit for enabling synchronization with at least two second fronthaul network units over a first single optical fiber in a fronthaul network. The first fronthaul network unit transmits DL radio data traffic intended for one or more of the at least two second fronthaul network units using a first optical port that outputs a first optical signal having a first optical wavelength. Also, the first fronthaul network unit transmits packet-based synchronization messages to the at least two second fronthaul network units using a second optical port that outputs an second optical signal having a second optical wavelength, wherein the second optical wavelength is different from the first optical wavelength. Further, the first fronthaul network unit multiplexes the first optical signal from the first optical port and the second optical signal from the second optical port onto the same single optical fiber towards the at least two second fronthaul network units.

According to a fourth aspect of embodiments herein, the object is achieved by a first fronthaul network unit for enabling synchronization with at least two second fronthaul network unit over a first single optical fiber in a fronthaul network. The first fronthaul network unit is configured to transmit DL radio data traffic intended for one or more of the at least two second fronthaul network units using a first optical port that outputs a first optical signal having a first optical wavelength. The first fronthaul network unit is also configured to transmit packet-based synchronization messages to the at least two second fronthaul network units using a second optical port that outputs an second optical signal having a second optical wavelength, wherein the second optical wavelength is different from the first optical wavelength. The first fronthaul network unit is further configured to multiplex the first optical signal from the first optical port and the second optical signal from the second optical port onto the same single optical fiber towards the at least two second fronthaul network units.

By enabling for a shared wavelength to be used for all packet-based synchronization messages from the first fronthaul network unit towards the at least two second fronthaul network units that is separate from a shared wavelength of the radio data traffic from the first fronthaul network unit towards the at least two second fronthaul, the fronthaul network units and method describe above allows for an increased number of the at least two second fronthaul network units to be served by the first fronthaul network unit in a fronthaul network while still maintaining a high synchronization accuracy. This will, for example, allow for the implementation of low latency services, high accuracy positioning and highly efficient radio co-ordination features in the fronthaul network. In addition, it further allows for both the use of low-cost components, as well as, maintaining of aggregation gains by statistical multiplexing for the radio data traffic. Hence, synchronization in a fronthaul network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIGS. 10-11 are schematic illustration of embodiments of a first fronthaul network unit.

FIG. 13 is another flowchart depicting embodiments of a method in a first fronthaul network unit, FIGS. 15-17 are diagrams illustrating packet-based synchronization messages transmitted in UL and DL according to embodiments of the first and second fronthaul network units.

DETAILED DESCRIPTION

Figure 1:
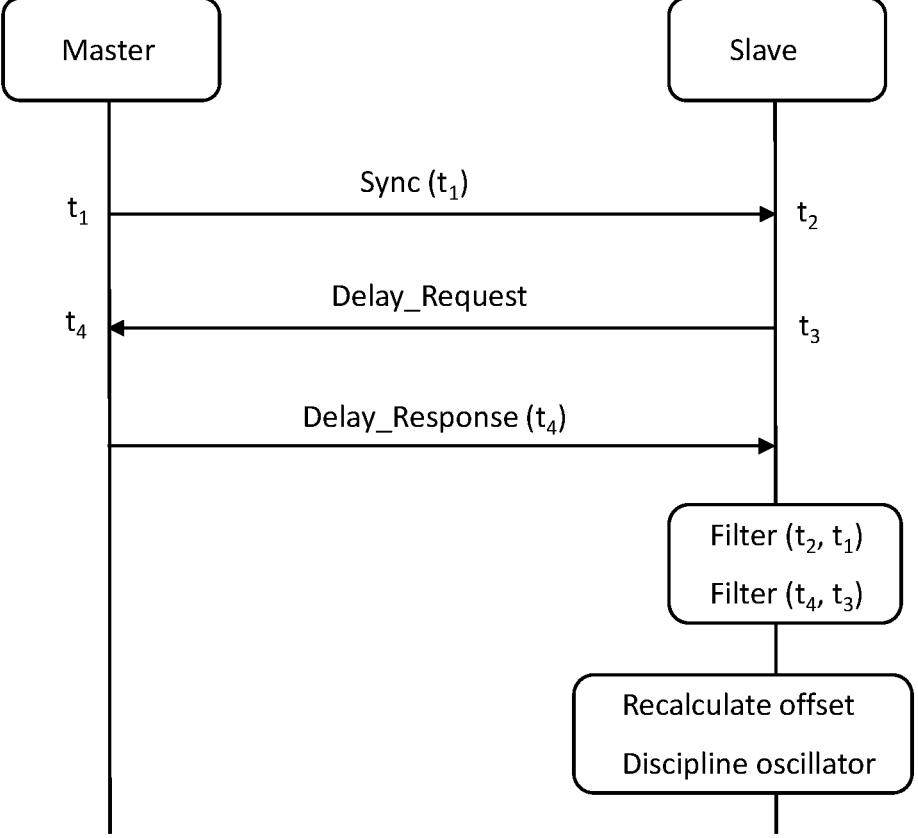
FIG. 1 is a signalling diagram of a PTP exchange between a master clock unit and a slave clock unit in an fronthaul network.

The figures are schematic and simplified for clarity, and they merely show details which are essential to the understanding of the embodiments presented herein, while other details have been left out. Throughout, the same reference numerals are used for identical or corresponding parts or steps.

Figure 5:
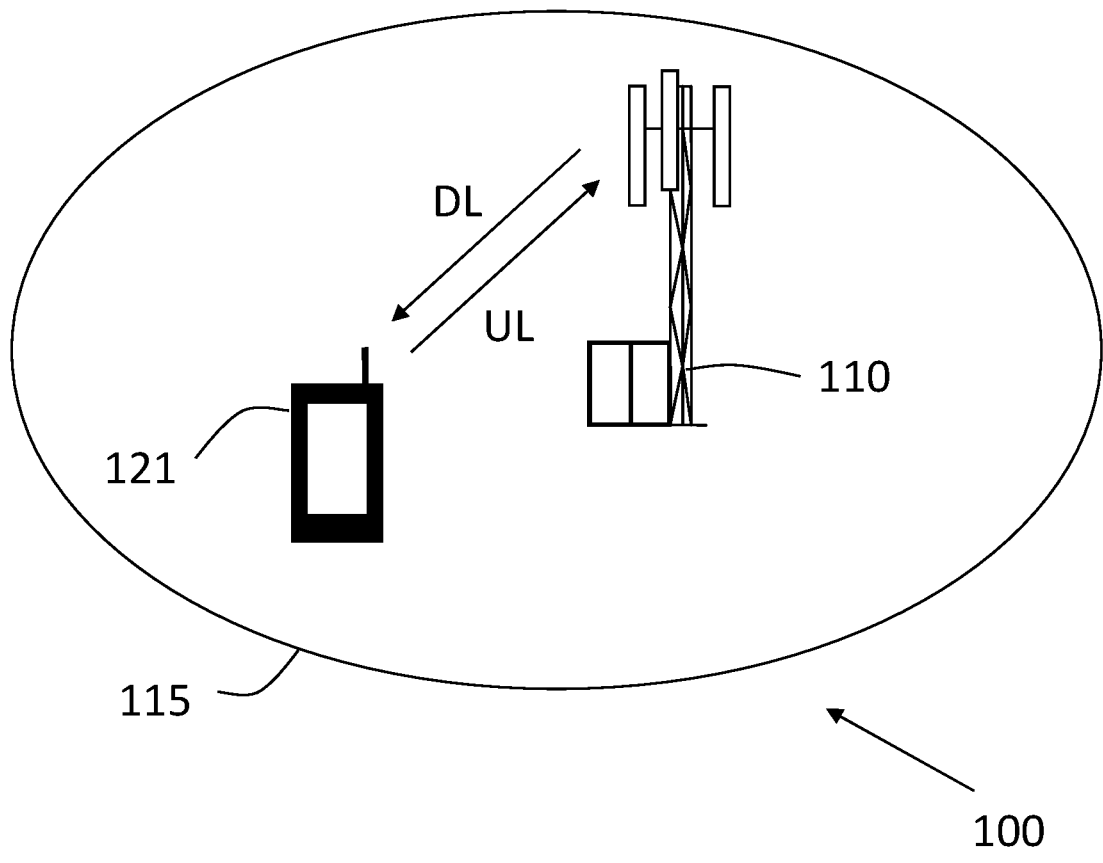
FIG. 5 is a schematic block diagram illustrating a wireless communications network.

FIG. 5 depicts a wireless communications network 100 in which embodiments of a fronthaul network 500 and fronthaul network units 501, 520, 540 as described herein may operate. In some embodiments, the wireless communications network 100 may be a radio communications network, such as, New Radio (NR) network. Although, the wireless communications network 100 may also employ technology of any one of 2G/3G, Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM, or any other similar network or system. The wireless communications network 100 may also be an Ultra Dense Network, UDN, which e.g. may transmit on millimetre-waves (mmW).

The wireless communications network 100 comprises a network node 110. The network node 110 serves at least one cell 115. The network node 110 may correspond to any type of network node or radio unit capable of communicating with a wireless device and/or with another network node, such as, e.g. be a radio unit (RU), base station (BS), a radio base station, gNB, eNB, eNodeB, a Home Node B, a Home eNode B, femto Base Station (BS), pico BS, etc., in the wireless communications network 100. Further examples of the network node 110 may also be e.g. repeater, base station multi-standard radio (MSR) node such as MSR BS, eNodeB, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), etc. The network node 110 may also be adapted to communicate with core network nodes (not shown) in the wireless communications network 100 via, or by forming a part of, a fronthaul network 500 and fronthaul network units 520, 540 according to the embodiments described herein.

In FIG. 5, a wireless device 121 is located within the cell 115. The wireless device 121 is configured to communicate within the wireless communications network 100 via the network node 110 over a radio link served by the network node 110. The wireless device 121 may refer to any type of wireless device or user equipment (UE) communicating with a network node and/or with another wireless device in a cellular, mobile or radio communication network or system.

Examples of such wireless devices are mobile phones, cellular phones, Personal Digital Assistants (PDAs), smart phones, tablets, sensors equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), target device, device-to-device (D2D) wireless device, wireless device capable of machine to machine (M2M) communication, etc. Furthermore, although embodiments below are described with reference to FIG. 5, this should not be construed as limiting to the embodiments herein, but merely as an example made for illustrative purposes.

In reference to the embodiments described hereinafter, the term "first fronthaul network unit" may refer to any fronthaul network unit in a fronthaul network that operates as a master or master clock unit in regards to synchronization of time and frequency information with other fronthaul network units in the fronthaul network, such as, e.g. a grandmaster synchronization unit, GM. Also, the term "second fronthaul network unit" may refer to any fronthaul network unit in the fronthaul network that operates as a slave or slave clock unit in respect to a master, master clock unit or GM, such as, e.g. the first fronthaul network unit, in regards to synchronization of its time and frequency information. In cases wherein the PTP protocol is used, the "first fronthaul network unit" may also be referred to as a PTP master, and the "second fronthaul network unit" as a PTP slave.

Although the embodiments herein primarily are described with reference to a fronthaul network in a RAN, it should also be noted that the embodiments described herein may also be implemented in other fronthaul network transport solutions in a communications network. One example of another such fronthaul network transport solution may be a communications network having a so-called DRAN architecture. In a DRAN architecture, a radio unit and a basebands processing unit may be co-located at the same site. The co-located sites may then be connected in the same way up to a central site or office, just as in the fronthaul network example described by the embodiments herein. In this case, the central site/office performs no baseband processing, but only switching/routing and operating as a synchronization signal source. Here, the fronthaul network transport solution may be denoted as a backhaul network instead of fronthaul network, while all parts of the fronthaul network are basically the same. In fact, it should further be noted that although the embodiments herein primarily are described with reference to fronthaul networks, such as, a fronthaul or backhaul networks, the embodiments described herein may also be advantageously implemented for other network transport solutions in any communications network where a high synchronization accuracy between multiple network units is desired.

As part of trying to improve synchronization in fronthaul networks and developing the embodiments described herein, a novel solution for performing synchronization signal distribution, also referred to as sync distribution, in the fronthaul network domain has been realized. Also, according to some embodiments, this may also include automated discovery and configuration of the synchronization endpoints in the fronthaul network.

Figure 2:
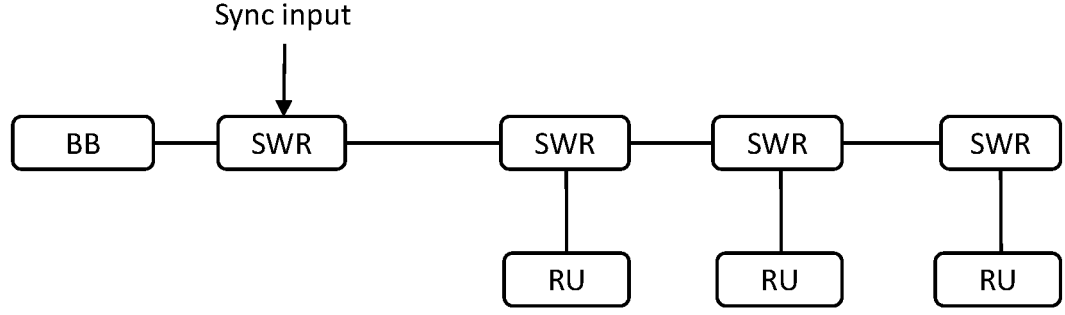
FIG. 2 is a schematic block diagram of a network architecture for a packet-based fronthaul network.

One aspect on which the embodiments herein are based is to have a shared separate wavelength for synchronization signals and messages when these are distributed to each Switch/Router, SWR, and Radio Unit, RU, endpoints in the fronthaul network over a single optical fiber. Simultaneously, RAN data traffic is transmitted to the SWRs/RUs over the same single fiber but on a separate wavelength. This advantageously allows each of the SWRs/RUs in the fronthaul network to act as a slave clock that measures and adapts its synchronization towards a master clock, e.g. a central Baseband processing unit, BB, and SWR, over the separate and shared synchronization wavelength, and thus is able to achieve a high level of synchronization accuracy. At the same time, the RAN data traffic transmitted on a different wavelength may be switched/routed providing statistical multiplexing gains of the RAN data traffic at each SWR. This will not only utilize the capacity of the access link and aggregation SWR optical ports more efficiently, but also requires fewer expensive high bitrate RAN data traffic interfaces at the master clock, e.g. the central BB/SWR, compared to, for example, Point-to-Point or pure wavelength connected SWR/RU sites (as described in FIGS. 2-4).

Furthermore, the embodiments herein deliver a very high sync accuracy to the RAN fronthaul network endpoints, i.e. the SWR/RUs. This allows a fronthaul network with a large number of forwarding hops for the switch/routed packets in the access transport, which at the same time may is able to maintain a high synchronization accuracy. This, in turn, allows for the implementation of, for example, low latency services, high accuracy positioning, highly efficient radio co-ordination features, etc. Further advantages of the embodiments herein is that they allow for the use of cost-efficient grey optics for the high bitrate RAN data traffic ports on both the SWRs, as well as, on the RAN equipment, i.e. RUs/BBs. Additionally, for the sync traffic, cost-efficient low rate coloured optics may be used, which further reduces implementation cost in the fronthaul network.

Figure 3:
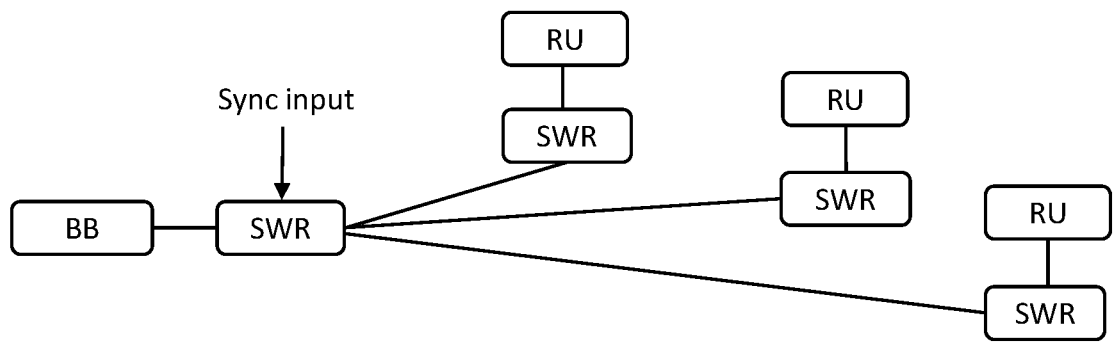
FIG. 3 is another schematic block diagram of a network architecture for a packet-based fronthaul network.
Figure 4:
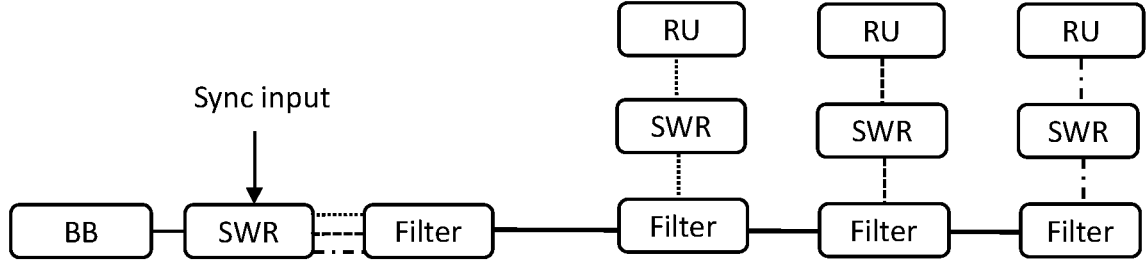
FIG. 4 is a further schematic block diagram of a network architecture for a packet-based fronthaul network.

According to some embodiments herein, automated discovery and configuration of fronthaul network units, e.g. PTP endpoints (SWRs utilizing the PTP protocol for synchronization), is also provided. This will additionally simplify the installation and lower the cost for fronthaul network deployment. In short, the embodiments herein may provide both the aggregation gains (statistical multiplexing) of the packet switched/routed network (as shown in FIG. 1) and the high level synchronization accuracy from the point-to-point wavelength system network (as shown in FIG. 3).

Figure 6:
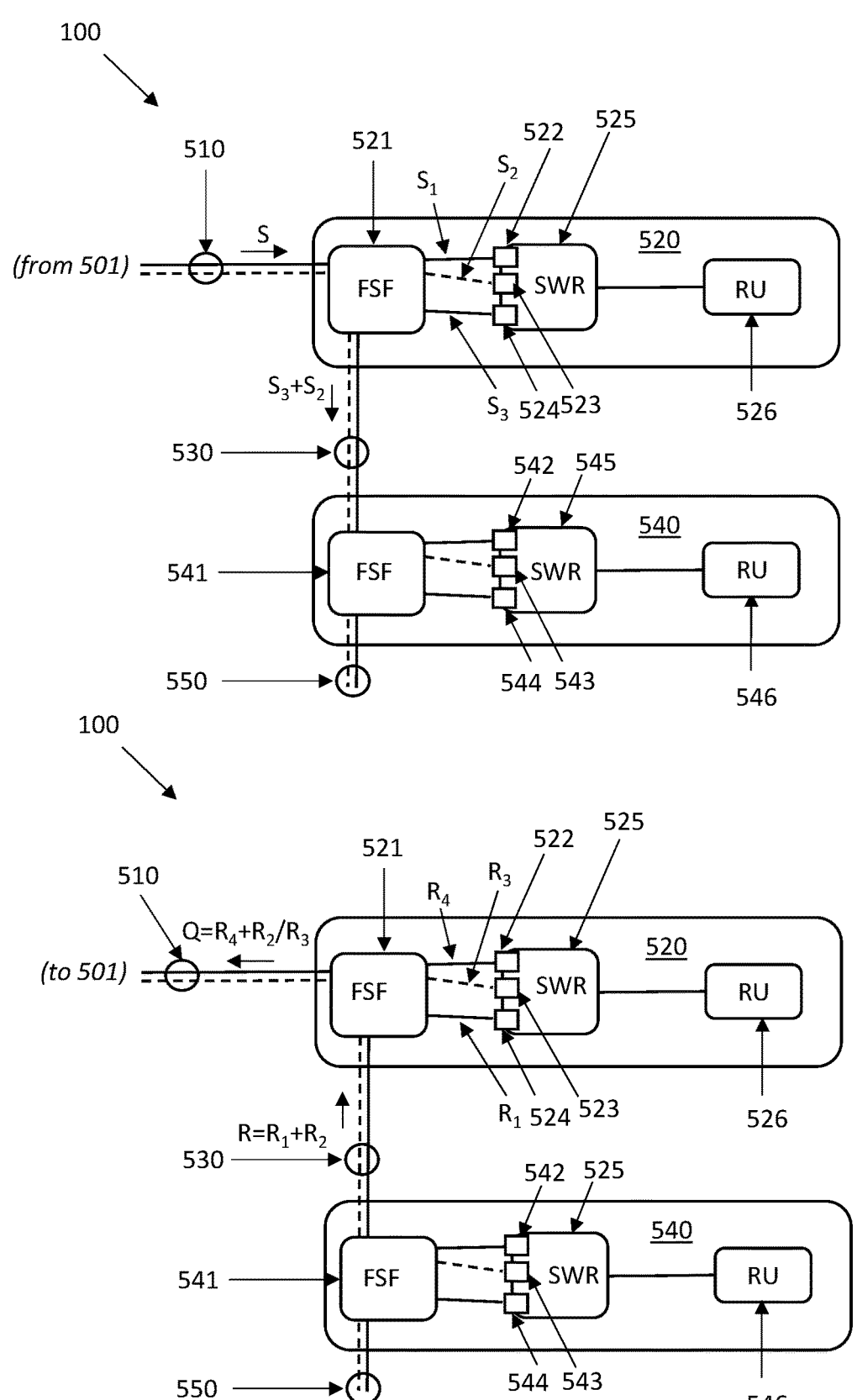
FIGS. 6-8 are schematic illustrations of embodiments of second fronthaul network units.
Figure 7:
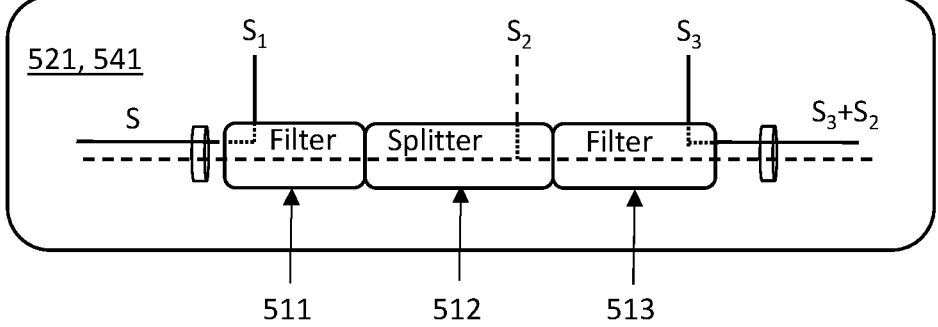
Figure 8:
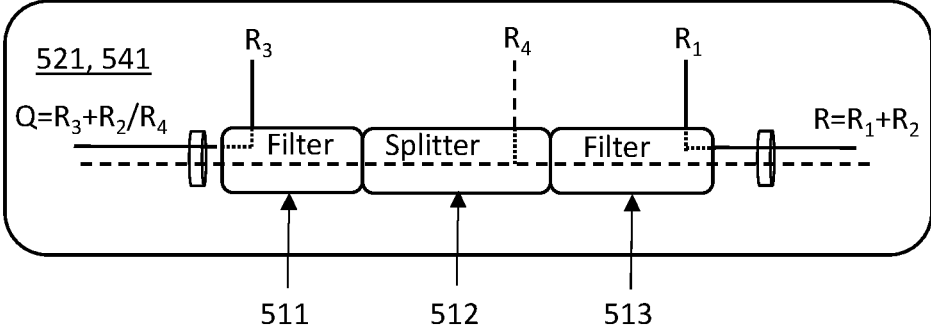

FIGS. 6-8 shows schematic block diagrams of embodiments of second fronthaul network units 520, 540 for enabling a synchronization with a first fronthaul network unit 501 over a single optical fiber 510 in a fronthaul network 500. For the embodiments of the second fronthaul network units 520, 540 described below, it should be noted that the first fronthaul network unit 501, i.e. the synchronization master site or baseband processing site in the fronthaul network 500, multiplexes a DL radio data traffic and packet-based synchronization messages from separate physical optical source ports generating optical signals having different wavelengths onto the same first single optical fiber 510. This is illustrated in FIGS. 6-8 by the DL radio data traffic and the first optical wavelength $\lambda_1$ being represented as wholly drawn lines, while the packet-based synchronization messages and the second optical wavelength $\lambda_2$ are represented by dashed lines. Embodiments of the first fronthaul network unit 501 and methods therein is described further below with reference to FIGS. 10-12.

The second fronthaul network units 520, 540 may comprise a Filter-Splitter-Filter, FSF, unit 521, 541, or a different optical unit/units providing a similar functionality. The FSF unit 521, 541 may comprise a first passive optical filter 511, an optical splitter 512, and a second optical filter 513 as shown in FIGS. 7-8. The second fronthaul network units 520, 540 may also comprise a switch or router, SWR, 525, 545 comprising a first optical port 522, 542, a second optical port 523, 543, and a third optical port 524, 544. The first, second and third optical ports 522, 542; 523, 543; 524, 544 may be provided by optical communication devices, such as, Small Form-factor transceivers or pluggables, SFPs. Further, the second fronthaul network units 520, 540 further comprise a Radio Unit, RU, 526, 546. The RU 526, 546 may be a RF processing unit capable of transmitting and receiving RAN data traffic over a radio air interface. It should here be noted that the FSF unit 521 of the second fronthaul network unit 520 is connected to the FSF unit 541 of the second fronthaul network unit 540 over a single optical fiber 530. Although only two second fronthaul network units 520, 540 are shown and described herein, a large number of second fronthaul network units may in this way be interconnected in the fronthaul network 500. This is, for example, indicated by the third single optical fiber 550 connected to the FSF unit 541 of the second fronthaul network unit 540 in FIG. 6.

First, as shown in the upper part of FIG. 6, when a first optical signal S is received in the FSF unit 521 of the second fronthaul network unit 520 in the DL direction, the first passive optical filter 511 in the FSF unit 521 may filter out DL radio data traffic in a second optical signal $S_1$ towards the optical port 522 of the SWR 525 and the RU 526. The first passive optical filter 511 in the FSF unit 521 may also filter out and forward packet-based synchronization messages in a third optical signal $S_2$ to the optical splitter 512. This may be performed since the DL radio data traffic is transmitted over the first single optical fiber 510 by the first fronthaul network unit 501 on a first optical wavelength $\lambda_1$ and the packet-based synchronization messages are transmitted over the first single optical fiber 510 by the first fronthaul network unit 501 on a second optical wavelength $\lambda_2$. Here, the second optical wavelength $\lambda_2$ is different from the first optical wavelength $\lambda_1$. This is illustrated in FIGS. 6-7 by the DL radio data traffic and the first optical wavelength $\lambda_1$ being represented as wholly drawn lines, while the packet-based synchronization messages and the second optical wavelength $\lambda_2$ are represented by dashed lines. This allows, for example, the high bitrate radio data traffic on the DL to be transmitted and received using cost-effective grey optics, i.e. optical equipment transmitting on so-called grey wavelengths may be used for the optical ports 522, 524 in the SWR 525, while the packet-based synchronization messages may be transmitted and received using cost-efficient low-bitrate colored optics, i.e. optical equipment suitable for low bitrates transmitting on colored wavelengths may be used for the optical port 523 in the SWR 525.

The optical splitter 512 then splits the third optical signal $S_2$ carrying packet-based synchronization messages out towards the optical port 523 of the SWR 525 and the RU 526, and also forwards it to the second passive optical filter 513 in the FSF unit 521. This is possible since the packet-based synchronization messages, such as, sync signal and announcements messages, in the DL direction on the separate wavelength $\lambda_2$ are the same for each second fronthaul network unit in the fronthaul network 500, therefore this third optical signal $S_2$ may simply be split out at each second fronthaul network unit in the fronthaul network 500.

The second passive optical filter 513 in the FSF unit 521 may then forward the third optical signal $S_2$ carrying packet-based synchronization messages out on a second single optical fiber 530 towards the next site, i.e. the second fronthaul network unit 540. Here, second passive optical filter 513 in the FSF unit 521 may also receive DL radio data traffic in a fourth optical signal $S_3$ from the third optical port 523 of the SWR 525. Here, the fourth optical signal S3 may have a third optical wavelength $\lambda_3$ that may be the same wavelength as the first optical wavelength $\lambda_1$. However, the third optical wavelength $\lambda_3$ may here also be another wavelength than the first optical wavelength $\lambda_1$, but only as long as it is still different from the second optical wavelength $\lambda_2$. The fourth optical signal $S_3$ may, in this case, be multiplexed or optically added by the second passive optical filter 513 onto the same second single optical fiber 530 as the third optical signal $S_2$ carrying packet-based synchronization messages. This allows the SWR 525 to perform local switching/routing and statistical multiplexing based on the received DL radio data traffic received in the second optical signal $S_2$ before forwarding the DL radio data traffic not intended for the second fronthaul network unit 520, i.e. DL radio data traffic destined for another second fronthaul network unit in the fronthaul network 500, such as, e.g. the second fronthaul network unit 540.

It should be noted that the same procedure as described above for the second fronthaul network unit 520 may be repeated by each second fronthaul network unit in the fronthaul network 500 for a downlink optical signal. For example, the procedure may be repeated by the second fronthaul network unit 540 upon receiving the optical signal $S_3+S_2$ in the FSF unit 541.

Secondly, as shown in the lower part of FIG. 6, when a fifth optical signal R is received in the FSF unit 521 of the second fronthaul network unit 520 in the UL direction, the second passive optical filter 513 in the FSF unit 521 may filter out UL radio data traffic in a sixth optical signal $R_1$ towards the optical port 524 of the SWR 525 and the RU 526. The second passive optical filter 513 in the FSF unit 521 may also filter out and forward packet-based synchronization messages in a seventh optical signal $R_2$ to the optical splitter 512. This may be performed since the UL radio data traffic is transmitted over the second single optical fiber 530 by the second fronthaul network unit 540 on a fourth optical wavelength $\lambda_4$ and the packet-based synchronization messages are transmitted over the second single optical fiber 530 by the second fronthaul network unit 540 on a fifth optical wavelength $\lambda_5$. Here, the fifth optical wavelength $\lambda_5$ is different from the fourth optical wavelength $\lambda_4$. This is also illustrated in FIGS. 6 and 8 by the UL radio data traffic and the fourth optical wavelength $\lambda_4$ being represented as wholly drawn lines, while the packet-based synchronization messages and the fifth optical wavelength $\lambda_5$ are represented by dashed lines. Similarly as for the DL direction, this allows the high bitrate radio data traffic on the UL to be transmitted and received using cost-effective grey optics, i.e. optical equipment transmitting on so-called grey wavelengths may be used for the optical ports 522, 524 in the SWR 525, while the packet-based synchronization messages may be transmitted and received using cost-efficient low-bitrate colored optics, i.e. optical equipment suitable for low bitrates transmitting on colored wavelengths may be used for the optical port 523 in the SWR 525.

The optical splitter 512 may forward the seventh optical signal $R_2$ carrying packet-based synchronization messages to the first passive optical filter 511 in the FSF unit 521. However, the optical splitter 512 may also receive an eight optical signal $R_3$ carrying packet-based synchronization messages from the optical port 523 of the SWR 525 in the second fronthaul network unit 520. In some embodiments, the eight optical signal $R_3$ may have the same wavelength as the fifth optical wavelength $\lambda_5$, i.e. the same optical wavelength as the seventh optical signal $R_2$. Also, according to some embodiments, the fifth optical wavelength $\lambda_5$ may have be the same optical wavelength as the second optical wavelength $\lambda_2$. In the latter case, this means that the packet-based synchronization messages are transmitted over the first single optical fiber 530 using the same optical wavelength in both the DL and UL direction. Upon receiving the eight optical signal $R_3$, the optical splitter 512 may also multiplex, or optically add, the eight optical signal $R_3$ with the seventh optical signal $R_2$ before transmitting the resulting optical signal $R_2/R_3$ to the first passive optical filter 511 in the FSF unit 521. It should be noted that in case the eight optical signal $R_3$ and the seventh optical signal $R_2$ are having the same wavelength, there may be a need for a collision avoidance and conflict resolution scheme, which is described further below with reference to FIGS. 13-18. In other words, in case there is a common optical synchronization wavelength for all SWRs/RUs 525,526; 545, 546 in all second fronthaul network units 520, 540, the packet-based synchronization messages needs to be assigned specific time slots in UL direction in which the SWRs/RUs 525,526; 545, 546 may perform e.g. specific IEEE1588 measurements and adaptation procedures.

The first passive optical filter 511 in the FSF unit 521 outputs the resulting optical signal $R_2/R_3$ from the optical splitter 512 carrying packet-based synchronization messages out on the first single optical fiber 510 towards the first fronthaul network unit 501. Here, first passive optical filter 511 in the FSF unit 521 may also receive UL radio data traffic in a ninth optical signal $R_4$ from the first optical port 521 of the SWR 525. The ninth optical signal $S_4$ may, in this case, be multiplexed or optically added by the first passive optical filter 511 onto the same first single optical fiber 510 to the resulting optical signal $R_2/R_3$ carrying packet-based synchronization messages. This allows the SWR 525 to perform local switching/routing and statistical multiplexing based on the received UL radio data traffic received in the sixth optical signal $R_1$ before forwarding any UL radio data traffic not intended for the second fronthaul network unit 520 towards the first fronthaul network unit 501 in the fronthaul network 500 via the ninth optical signal $R_4$.

It should be noted that the same procedure as described above for the second fronthaul network unit 520 may be repeated by each second fronthaul network unit in the fronthaul network 500 for an uplink optical signal, such as, for example, the second fronthaul network unit 540 upon receiving an uplink optical signal from the next second fronthaul network unit (not shown) on the third single optical fiber 550.

It should also be noted that even if the delay, jitter, asymmetry on the wavelengths used for transmitting and receiving the packet-based synchronization messages, i.e. the second and fifth wavelengths $\lambda_2$ and $\lambda_5$, is not very large, it still needs to be compensated for. Thus, each SWR/RU in each second fronthaul network unit 520, 540 may perform a modified IEEE1588 procedure to adapt to the sync inaccuracy. This is also described further below with reference to FIGS. 13-18.

According to some embodiments, the first optical wavelength $\lambda_1$ may be the same wavelength as one or more of: the third optical wavelength $\lambda_3$, the fourth optical wavelength $\lambda_4$, and the sixth optical wavelength $\lambda_6$. This means that the radio data traffic, i.e. the RAN data traffic, in the fronthaul network 500 may be transmitted over the first single optical fiber 530 using the same optical wavelength, e.g. grey optical wavelengths, in both the DL and UL direction. Here, it should also be noted the first optical wavelength $\lambda_1$, the third optical wavelength $\lambda_3$, the fourth optical wavelength $\lambda_4$, and the sixth optical wavelength $\lambda_6$ may also all or some be different from each other, just as long as they are not the same wavelengths as the second and fifth wavelengths $\lambda_2$ and $\lambda_5$.

Figure 11:
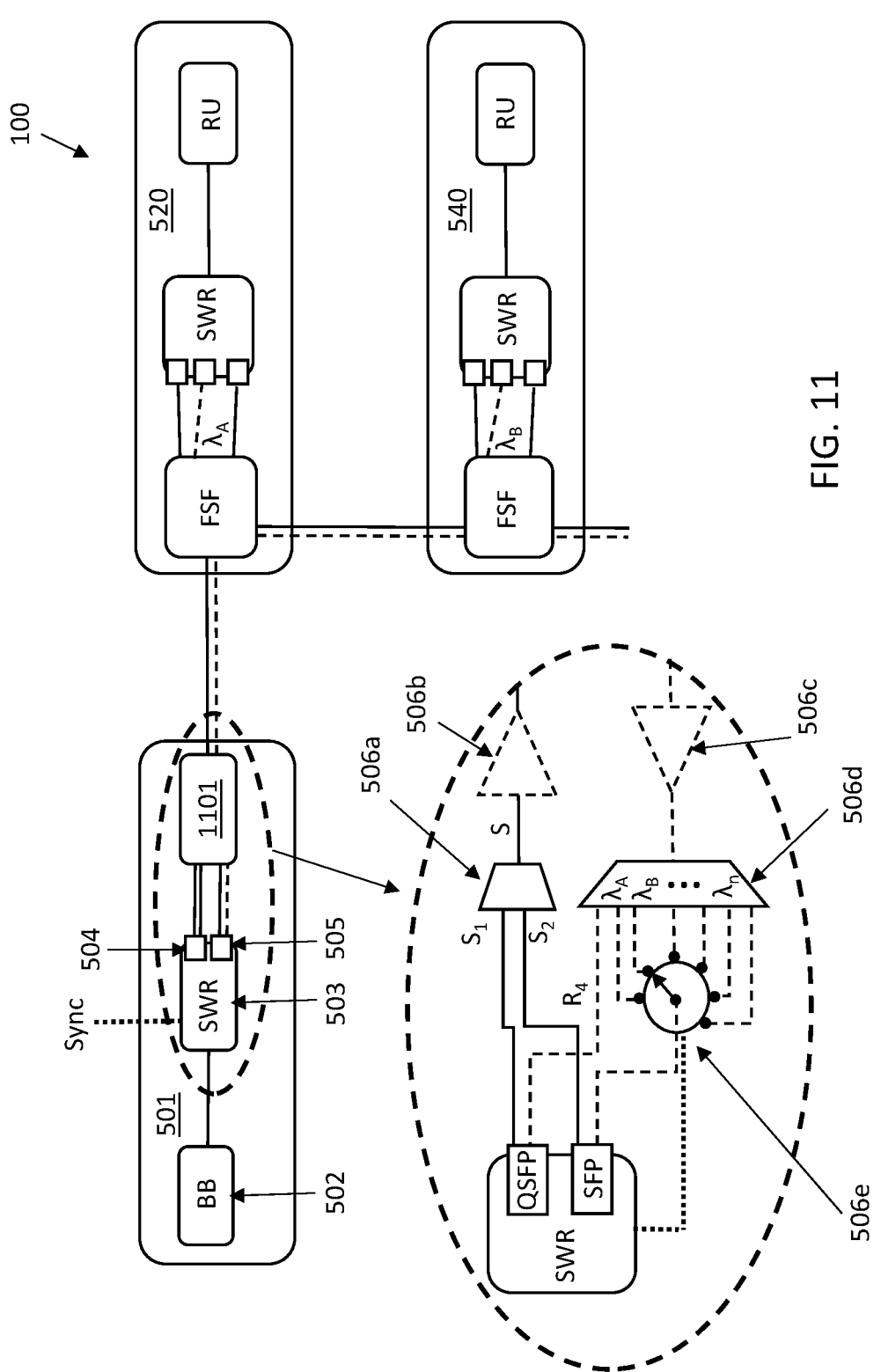

According to some embodiments, the fifth optical wavelength $\lambda_5$ may be an optical wavelength that is dedicated to and uniquely emitted by the second fronthaul network unit 520 in the fronthaul network 500. In this case, each second fronthaul network unit in the fronthaul network 500 should be configured with an optical wavelength that is dedicated to and uniquely emitted by each second fronthaul network unit in the fronthaul network 500. This is illustrated in FIG. 11 wherein the second fronthaul network unit 520 is transmitting the packet-based synchronization messages on the dedicated wavelength $\lambda_A$, while the second fronthaul network unit 540 is transmitting the packet-based synchronization messages on the dedicated wavelength $\lambda_B$. This, however, requires the first fronthaul network unit 501 to be equipped with a de-multiplexer 506*d* and an optical switch 506*e*, as shown in FIG. 11, or other optical equipment with similar functionality.

As described above, it follows that the second fronthaul network units 520, 540 is configured to receive a first optical signal S on the single optical fiber 510. The second fronthaul network unit 520, 540 is also configured to separate the received first optical signal S into a second optical signal $S_1$ carrying downlink, DL, radio data traffic having a first optical wavelength $\lambda_1$ and a third optical signal $S_2$ carrying packet-based synchronization messages having a second optical wavelength $\lambda_2$, wherein the second optical wavelength $\lambda_2$ is different from the first optical wavelength $\lambda_1$. Further, the second fronthaul network units 520, 540 is configured to output the separated second optical signal $S_1$ towards a first optical port 522, 542 in the second fronthaul network unit 520, 540. Also, the second fronthaul network units 520, 540 is configured to split the separated third optical signal $S_2$ towards a second optical port 523, 543 in the second fronthaul network unit 520, 540.

In some embodiments, the second fronthaul network units 520, 540 may further be configured to receive DL radio data traffic in the separated second optical signal $S_1$ via the first optical port 522, 542, and packet-based synchronization messages in the split separated third optical signal $S_2$ via the second optical port 523, 543. In some embodiments, the second fronthaul network units 520, 540 may further be configured to transmit DL radio data traffic not intended for the second fronthaul network unit 520, 540 using a third optical port 524, 544 that outputs a fourth optical signal $S_3$ having a third optical wavelength $\lambda_3$. Here, the second fronthaul network units 520, 540 may further be configured to multiplex the fourth optical signal $S_3$ from the third optical port 524, 544 and the separated third optical signal $S_2$ onto a second single optical fiber 530.

Also, according to some embodiments, the second fronthaul network units 520, 540 may further be configured to receive a fifth optical signal R on the second single optical fiber 103. In this case, the second fronthaul network units 520, 540 may also be configured to separate the received fifth optical signal R into a sixth optical signal $R_1$ carrying UL radio data traffic having a fourth optical wavelength $\lambda_4$ and a seventh optical signal $R_2$ carrying packet-based synchronization messages having a fifth optical wavelength $\lambda_5$, wherein the fourth optical wavelength $\lambda_4$ is different from the fifth optical wavelength $\lambda_5$. The second fronthaul network units 520, 540 may further be configured to output the separated sixth optical signal $R_1$ towards the third optical port 524, 542 in the second fronthaul network unit 520, 540. In some embodiments, the second fronthaul network units

520, 540 may further be configured to transmit UL radio data traffic to the first fronthaul network unit 501 using the first optical port 522, 542 that outputs an ninth optical signal $R_4$ having a sixth optical wavelength $\lambda_6$.

In some embodiments, the second fronthaul network units 520, 540 may further be configured to transmit packet-based synchronization messages to the fronthaul network unit 501 using the second optical port 523, 543 that outputs an eight optical signal $R_3$ having the fifth optical wavelength $\lambda_5$, wherein the fifth optical wavelength $\lambda_5$ is different from the sixth optical wavelength $\lambda_6$. In this case, the second fronthaul network units 520, 540 may further be configured to multiplex the ninth optical signal $R_4$ from the first optical port 522, 542 and the eight optical signal $R_3$ from the second optical port 523, 543 onto the first single optical fiber 510 towards the first fronthaul network unit 501. Optionally, the second fronthaul network units 520, 540 may further be configured to multiplex the ninth optical signal $R_4$ from the first optical port (522, 542) and the separated seventh optical signal $R_2$ onto the first single optical fiber 510 towards the first fronthaul network unit 501.

In some embodiments, the first optical wavelength $\lambda_1$ may be the same wavelength as one or more of: the third optical wavelength $\lambda_3$, the fourth optical wavelength $\lambda_4$, and the sixth optical wavelength $\lambda_6$. This means that the same wavelength may be used in both the UL and DL direction for the UL and DL radio data traffic over the first single optical fiber 510. Also, according to some embodiments, the second optical wavelength $\lambda_2$ may be the same wavelength as the fifth optical wavelength $\lambda_5$. This means that the same wavelength may be used in both the UL and DL direction for the packet-based synchronization messages over the first single optical fiber 510. Alternatively, instead of the latter and according to some embodiments, the fifth optical wavelength $\lambda_5$ may be an optical wavelength $\lambda_A$, $\lambda_B$ that is dedicated to and uniquely emitted by the second fronthaul network unit 520, 540 in the fronthaul network 500.

Figure 9:
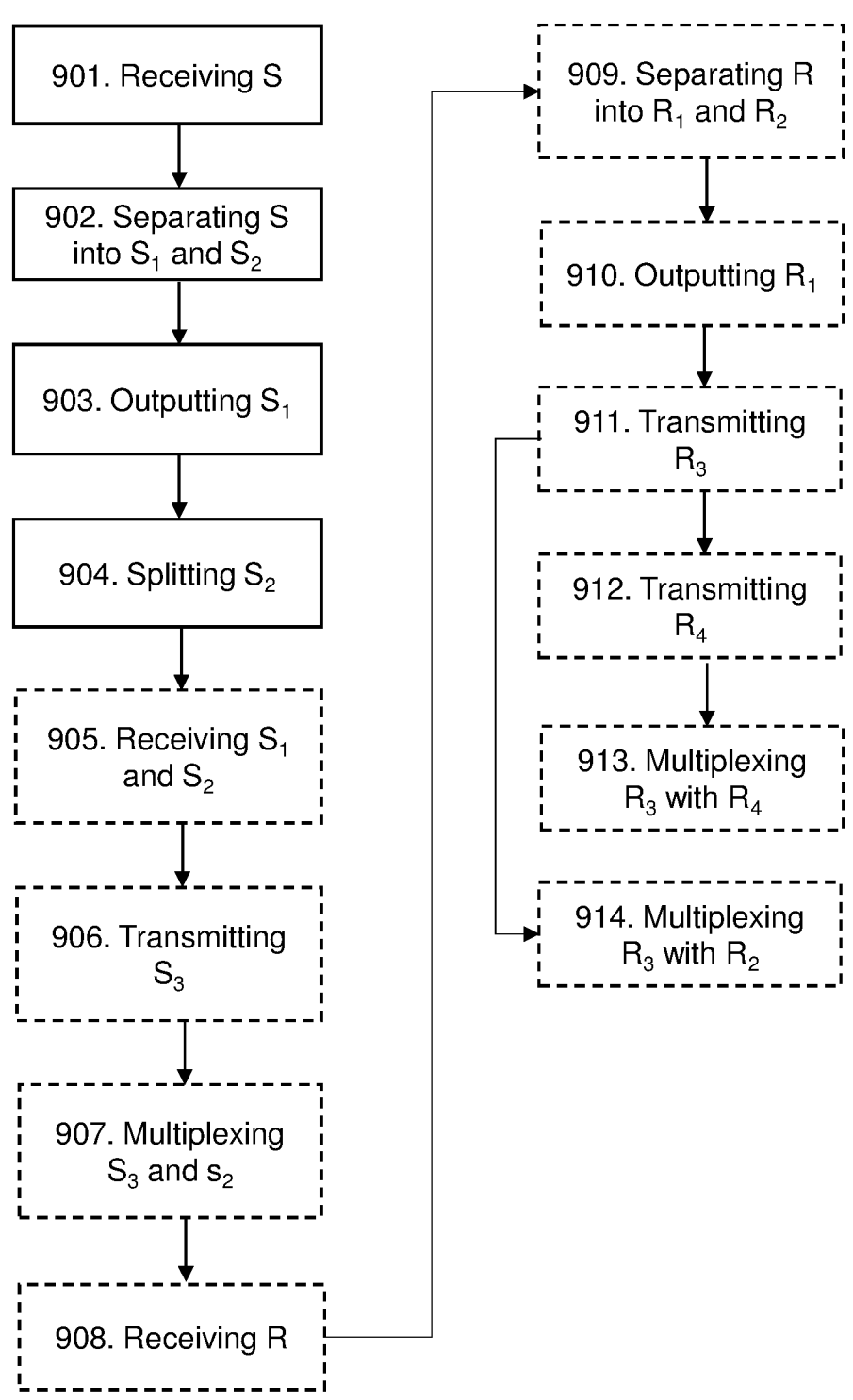
FIG. 9 is a flowchart depicting embodiments of a method in a second fronthaul network unit.

Examples of embodiments of a method performed by second fronthaul network unit 520, 540 for enabling synchronization with a first fronthaul network unit 501 over a single optical fiber 510 in a fronthaul network 500, will now be described with reference to the flowchart depicted in FIG. 9. FIG. 9 is an illustrated example of actions or operations which may be taken by a second fronthaul network unit 520, 540 in the fronthaul network 100 as described below with reference to FIGS. 6-8 and 11. The method may comprise the following actions.

Action 901. In the DL direction, the second fronthaul network unit 520, 540 receives a first optical signal S on the single optical fiber 510.

Action 902. Upon receiving the first optical signal S in Action 901, the second fronthaul network unit 520, 540 separates the received first optical signal S into a second optical signal $S_1$ carrying DL radio data traffic having a first optical wavelength $\lambda_1$ and a third optical signal $S_2$ carrying packet-based synchronization messages having a second optical wavelength $\lambda_2$. Here, the second optical wavelength $\lambda_2$ is different from the first optical wavelength $\lambda_1$.

Action 903. After separating the first optical signal S into a second optical signal $S_1$ and third optical signal $S_2$, the second fronthaul network unit 520, 540 outputs the separated second optical signal $S_1$ towards a first optical port 522, 542 in the second fronthaul network unit 520, 540.

Action 904. After separating the first optical signal S into a second optical signal $S_1$ and third optical signal $S_2$, the second fronthaul network unit 520, 540 also splits the separated third optical signal $S_2$ towards a second optical port 523, 543 in the second fronthaul network unit 520, 540. The actions 901-904 may, for example, be performed by the FSF unit 521, 541 in the second fronthaul network unit 520, 540 as shown in FIGS. 6-8.

Action 905. The second fronthaul network unit 520, 540 may then also receive DL radio data traffic in the separated second optical signal $S_1$ via the first optical port 522, 542, and packet-based synchronization messages in the split separated third optical signal $S_2$ via the second optical port 523, 543.

Action 906. The second fronthaul network unit 520, 540 may also transmit or forward DL radio data traffic not intended for the second fronthaul network unit 520, 540 using a third optical port 524, 544 that outputs a fourth optical signal $S_3$ having a third optical wavelength $\lambda_3$. The actions 905-906 may, for example, be performed by the SWR 525, 545 in the second fronthaul network unit 520, 540 as shown in FIGS. 6-8.

Action 907. The second fronthaul network unit 520, 540 may then also multiplex the fourth optical signal $S_3$ from the third optical port 524, 544 and the separated third optical signal $S_2$ onto a second single optical fiber 530. This action may, for example, be performed by the FSF unit 521, 541 in the second fronthaul network unit 520, 540 as shown in FIGS. 6-8.

Action 908. In the UL direction, the second fronthaul network unit 520, 540 may receive a fifth optical signal R on the second single optical fiber 530.

Action 909. Upon receiving the fifth optical signal R in Action 908, the second fronthaul network unit 520, 540 may separate the received fifth optical signal R into a sixth optical signal $R_1$ carrying UL radio data traffic having a fourth optical wavelength $\lambda_4$ and a seventh optical signal $R_2$ carrying packet-based synchronization messages having a fifth optical wavelength $\lambda_5$, wherein the fourth optical wavelength $\lambda_4$ is different from the fifth optical wavelength $\lambda_5$.

Action 910. After separating the received fifth optical signal R into a sixth optical signal $R_1$ and seventh optical signal $R_2$, the second fronthaul network unit 520, 540 may also output the separated sixth optical signal $R_1$ towards the third optical port 524, 544 in the second fronthaul network unit 520, 540. The actions 908-910 may, for example, be performed by the FSF unit 521, 541 in the second fronthaul network unit 520, 540 as shown in FIGS. 6-8.

Action 911. The second fronthaul network unit 520, 540 may then also transmit UL radio data traffic to the first fronthaul network unit 501 using the first optical port 522, 542 that outputs an eighth optical signal $R_3$ having a sixth optical wavelength $\lambda_6$.

Action 912. The second fronthaul network unit 520, 540 may also transmit packet-based synchronization messages to the fronthaul network unit 501 using the second optical port 523, 543 that outputs a ninth optical signal $R_4$ having the fifth optical wavelength $\lambda_5$, wherein the fifth optical wavelength $\lambda_5$ is different from the sixth optical wavelength $\lambda_6$. The actions 911-912 may, for example, be performed by the SWR 525, 545 in the second fronthaul network unit 520, 540 as shown in FIGS. 6-8.

Action 913. The second fronthaul network unit 520, 540 may then also multiplex the eighth optical signal $R_3$ from the first optical port 522, 542 and the ninth optical signal $R_4$ from the second optical port 523, 543 onto the first single optical fiber 510 towards the first fronthaul network unit 501.

Action 914. Alternatively, or simultaneously as the multiplexing in Action 913, the second fronthaul network unit 520, 540 may also multiplex the eighth optical signal $R_3$ from the first optical port 522, 542 and the separated seventh optical signal $R_2$ onto the first single optical fiber 510 towards the first fronthaul network unit 501. These Actions 913-914 may, for example, be performed by the FSF unit 521, 541 in the second fronthaul network unit 520, 540 as shown in FIGS. 6-8.

It should also be noted that, in the above, according to some embodiments, the second optical wavelength $\lambda_2$ may be the same wavelength as the fifth optical wavelength $\lambda_5$. Also, in some embodiments, the first optical wavelength $\lambda_1$ may be the same wavelength as one or more of the third optical wavelength $\lambda_3$, the fourth optical wavelength $\lambda_4$, and the sixth optical wavelength $\lambda_6$. Furthermore, in some embodiments, the fifth optical wavelength $\lambda_5$ is an optical wavelength $\lambda_A$, $\lambda_B$, that is dedicated to and uniquely emitted by the second fronthaul network unit 520, 540 in the fronthaul network 500.

FIGS. 10-11 shows schematic block diagrams of embodiments of a first fronthaul network unit 501 for enabling synchronization with at least two second fronthaul network units 520, 540 over a single optical fiber 510 in a fronthaul network 500. The first fronthaul network unit 501 may comprise a baseband processing, BB, unit 502. The baseband processing unit 502 is arranged to co-operate over the fronthaul network 500 with Radio Frequency, RF, processing units, such as, the RUs 526, 546 in the second fronthaul network units 520, 540, to transmit and receive radio signals, i.e. UL and DL RAN data traffic, to and from wireless devices 121 over a radio air interface in a communications network 100. The first fronthaul network unit 501 also comprise a switch or router, SWR, 503 comprising a first optical port 504 and a second optical port 505. The first and second optical ports 504, 505 may be provided by optical communication devices, such as, Small Form-factor transceivers or pluggables, SFPs.

Further, in some embodiments, the first fronthaul network unit 501 may comprise a passive optical filter 506 as shown in FIG. 10. Alternatively, in some embodiments, the first fronthaul network unit 501 may comprise optical filtering unit 1101 as shown in FIG. 11. Here, the optical filtering unit 1101 may comprise an optical multiplexer 506*a* and an optional first optical signal amplifier 506*b*, or optical signal booster, configured to operate in the DL direction. In this case, the first fronthaul network unit 501 may also comprise an optional second optical signal amplifier 506*c*, or preamplifier, a de-multiplexer 506*d*, and an optical switch 506*e*, configured to operate in the UL direction. These latter embodiments requires the second fronthaul network units 520, 540 in the fronthaul network 500 to each be configured to transmit the packet-based synchronization messages in the UL direction on a dedicated optical wavelength that is uniquely emitted by each of the second fronthaul network units 540, 540 in the fronthaul network 500, such as, e.g. the optical wavelength $\lambda_A$ for the second fronthaul network unit 520 and the optical wavelength $\lambda_B$ for the second fronthaul network unit 540 as shown in FIG. 11. These latter embodiments will be described in more detail below.

First, as shown in the upper part of FIG. 10, the SWR 503 is connected to and may be provided by DL radio data traffic, i.e. RAN data traffic, from the BB unit 502 that is destined for a wireless device 121 may be served by one of the RUs 526, 546 in one of the second fronthaul network units 520, 540. The SWR 503 may then transmit received DL radio data traffic in a first optical signal $S_1$ from the first optical port 504 towards the first passive optical filter 506. The first optical signal $S_1$ is transmitted on a first optical wavelength $\lambda_1$. The SWR 503 may be connected to, configured as or comprise, a master or reference clock providing a synchronization input, such as, e.g. a Grand Master, GM, PTP clock. Based synchronization input, the SWR 503 outputs a second optical signal $S_2$ from the first optical port 504 towards the first passive optical filter 506, wherein the second optical signal $S_2$ carries packet-based synchronization messages to the second fronthaul network units 520, 540 in the fronthaul network 500. Here, the second optical signal $S_2$ is transmitted on a second optical wavelength $\lambda_2$, which second optical wavelength $\lambda_2$ is different from the first optical wavelength $\lambda_1$. Upon receiving the first and second optical signals $S_1$ and $S_2$ from the SWR 503, the first passive optical filter 506 multiplexes the first and second optical signals $S_1$ and $S_2$ into a multiplexed optical signal S and outputs the multiplexed optical signal S out onto the same single first optical fiber 510 in the DL direction towards the second fronthaul network units 520, 540 in the fronthaul network 500. This is illustrated in the upper part of FIG. 10 by the first optical signal S1 carrying the DL radio data traffic over the first optical wavelength $\lambda_1$ being represented as a wholly drawn line, while the second optical signal $S_2$ carrying the packet-based synchronization messages over the second optical wavelength $\lambda_2$ is represented by a dashed line. This allows high bitrate radio data traffic on the DL to be transmitted using cost-effective grey optics, i.e. optical equipment transmitting on so-called grey wavelengths may be used for the first optical port 504 in the SWR 503, while the packet-based synchronization messages may be transmitted using cost-efficient low-bitrate colored optics, i.e. optical equipment suitable for low bitrates transmitting on colored wavelengths may be used for the second optical port 505 in the SWR 503.

Secondly, as shown in the lower part of FIG. 10, when a third optical signal Q is received in the passive optical filter 506 of the first fronthaul network unit 501 in the UL direction via the single optical fiber 510, the passive optical filter 506 may filter out the UL radio data traffic in a fourth optical signal $R_4$ towards the first optical port 504 of the SWR 503 and the BB unit 502. The passive optical filter 506 may also filter out and forward packet-based synchronization messages in a fifth optical signal $R_2/R_3$ towards the second optical port 505 of the SWR 503. This may be performed since the UL radio data traffic is transmitted over the single optical fiber 510 by the second fronthaul network units 520, 540 on a separate shared third optical wavelength $\lambda_6$, while the packet-based synchronization messages are transmitted over the single optical fiber 510 by the second fronthaul network units 520, 540 on a separate shared fourth optical wavelength $\lambda_5$. Here, the third optical wavelength $\lambda_6$ is different from the fourth optical wavelength $\lambda_5$. This is also illustrated in the lower part of FIG. 10 by the UL radio data traffic and the third optical wavelength $\lambda_6$ being represented as wholly drawn lines, while the packet-based synchronization messages and the fourth optical wavelength $\lambda_5$ are represented by dashed lines. Similarly as for the DL direction, this allows the high bitrate radio data traffic on the UL to be received using cost-effective grey optics, i.e. optical equipment transmitting on so-called grey wavelengths may be used for the first optical port 504 in the SWR 503, while the packet-based synchronization messages may be transmitted and received using cost-efficient low-bitrate colored optics, i.e. optical equipment suitable for low bitrates transmitting on colored wavelengths may be used for the second optical port 505 in the SWR 503.

It should be noted that the packet-based synchronization messages may be timestamped data packets according to a packet-based synchronization protocol used for synchronizing time and/or frequency information in the at least two second fronthaul network units 520, 540. One example of such a packet-based synchronization protocol is the Precision Time Protocol, PTP, according to the IEEE 1588 standard specification.

As described above, in some embodiments, the passive optical filter 506 as shown in FIG. 10 may be substituted for the optical filtering unit 1101 as shown in FIG. 11. Here, it should be noted that for embodiments of the first fronthaul network unit 501 comprising the passive optical filter 506 there will be a need for a collision avoidance and conflict resolution scheme for the packet-based synchronization messages (which is described further below with reference to FIGS. 13-18). However, for embodiments of the first fronthaul network unit 501 comprising the optical filtering unit 1101 the issue of collision avoidance for the packet-based synchronization messages is resolved.

Here, it should also be noted that since each of the second fronthaul network units in the fronthaul network 500 are configured to transmit its packet-based synchronization messages with its own dedicated and uniquely transmitted optical wavelength, collisions on the same single fiber is avoided. In addition, this also eliminates the need for the SFPs and its optical ports used to transmit the packet-based synchronization messages in the second fronthaul network units, e.g. the optical ports 523, 543 in the second fronthaul network units 520, 540, to continuously switch their transmitting lasers on or off (which is necessary in case of using the same shared wavelength for all second fronthaul network units to transmit their packet-based synchronization messages in the UL direction over the single optical fiber).

Embodiments of the first fronthaul network unit 501 comprising the optical filtering unit 1101 will now be described with reference to FIG. 11. Here, it should be noted that each second fronthaul network unit 520, 540 in the fronthaul network 500 needs to be configured with its own dedicated and uniquely transmitted optical wavelength for transmitting packet-based synchronization messages in the fronthaul network 500, such as, e.g. the second fronthaul network unit 520 transmitting the packet-based synchronization messages on the dedicated wavelength $\lambda_A$, while the second fronthaul network unit 540 is transmitting the dedicated wavelength $\lambda_B$, as shown in FIG. 11. It should also be noted the optional first and second optical signal amplifier 506b, 506c may be incorporated based on the optical power budget for the fronthaul network 500.

As shown in FIG. 11, the SWR 503 will, in the DL direction, transmit DL radio data traffic and the packet-based synchronization messages in a similar way as described for above for the embodiments of the first fronthaul network unit 501 comprising the passive optical filter 506, i.e. DL radio data traffic and the packet-based synchronization messages will be transmitted on different wavelengths over the same single optical fiber in the DL direction. However, in the UL direction, the de-multiplexer 506d will instead separate the different wavelengths originating from each of the second fronthaul network units 520, 540 in the fronthaul network 500. The de-multiplexer 506d outputs the UL radio data traffic in the fourth optical signal $R_4$ towards the first optical port 504 of the SWR 503 and the BB unit 502. The de-multiplexer 506d also outputs each of the separated different wavelengths of the packet-based synchronization messages in the fifth optical signal $R_2/R_3$ on separate connections towards the optical switch 506e. The optical switch 506e may then output the separated different wavelengths towards the second optical port 505 of the SWR 503 by selecting the connections one-by-one. The optical switch 506e may be controlled and synchronized by the SWR 503, e.g. using the synchronization input from the GM PTP clock. This is illustrated by the dotted connection between the SWR 503 and the optical switch 506e in FIG. 11. The optical switch 506e may be controlled so that the wavelength on which the optical switch 506e is positioned corresponds at any time with the wavelength, or colour, used by the second fronthaul network unit 520, 530 that in each relevant timeslot has the turn to send its packet-based synchronization messages to the first fronthaul network unit 501. Since the first fronthaul network unit 501 is the unit which may allocate the timeslots to each of the second fronthaul network units 520, 540, the first fronthaul network unit 501 may also correspondently command the position of the optical switch 506e.

According to some embodiments, the second fronthaul network units 520, 540 may here be arranged to, for example, transmit PTP delay request messages continuously, while the first fronthaul network unit 501 sends a PTP delay response message only to a subset of the sent PTP delay request messages based on an overall time slot allocation. The first fronthaul network unit 501 would, in this case, need to respond alternating which wavelength it is listening to. Thus, the second fronthaul network units 520, 540 would detect some loss of PTP delay response messages, but this may be not be an issue if there is no time-out specified, or if this is specified accordingly. Here, in some embodiments, even though the PTP delay response message will all be sent on the same wavelength to all second fronthaul network units 520, 540 in the DL direction, a requestingPortIdentity parameter in the PTP delay response message may be used by the second fronthaul network units 520, 540 to select the correct message, i.e. the PTP delay response message intended for it.

As described above, it follows that the first fronthaul network units 501 is configured to transmit DL radio data traffic intended for one or more of the at least two second fronthaul network units 520, 540 using a first optical port 504 that outputs a first optical signal $S_1$ having a first optical wavelength $\lambda_1$. The first fronthaul network units 501 is also configured to transmit packet-based synchronization messages to the at least two second fronthaul network units 520, 540 using a second optical port 505 that outputs an second optical signal $S_2$ having a second optical wavelength $\lambda_2$, wherein the second optical wavelength $\lambda_2$ is different from the first optical wavelength $\lambda_1$. Further, the first fronthaul network units 501 is configured to multiplex the first optical signal $S_1$ from the first optical port 504 and the second optical signal $S_2$ from the second optical port 505 onto the same single optical fiber 510 towards the at least two second fronthaul network units 520, 540. According to some embodiments, the synchronization messages may be time-stamped data packets according to a packet-based synchronization protocol used for synchronizing time and/or frequency information in the at least two second fronthaul network units 520, 540.

In some embodiments, the first fronthaul network unit 501 may be configured to receive a third optical signal Q on the same single optical fiber 510. Here, the first fronthaul network unit 501 may also be configured to separate the received third optical signal Q into a fourth optical signal $R_3$ carrying UL radio data traffic having a third optical wavelength $\lambda_6$ and a fifth optical signal $R_2$; $R_4$ carrying packet-based synchronization messages having a fourth optical wavelength $\lambda_5$, wherein the third optical wavelength $\lambda_6$ is different from the fourth optical wavelength $\lambda_5$. The first fronthaul network unit 501 may further be configured to output the fourth optical signal $R_3$ towards the first optical port 504. Also, the first fronthaul network unit 501 may be configured to receive the fourth optical signal $R_3$ via the first optical port 504. In some embodiments, the first fronthaul network unit 501 may further be configured to output the fifth optical signal $R_2$; $R_4$) towards the second optical port 505. Also, the first fronthaul network unit 501 may further be configured to receive the fifth optical signal $R_2$; $R_4$ via the second optical port 505.

According to some embodiments, the second optical wavelength $\lambda_2$ is the same wavelength as the fourth optical wavelength $\lambda_5$, and wherein the first optical wavelength $\lambda_1$ is the same wavelength as the third optical wavelength $\lambda_6$.

In some embodiments, the first fronthaul network unit 501 may further be configured to de-multiplex the fifth optical signal $R_2$; $R_4$ into at least two optical signals having separate optical wavelengths $\lambda_A$, $\lambda_B$, . . . , $\lambda_n$ wherein each of the separate optical wavelengths $\lambda_A$, $\lambda_B$, . . . , $\lambda_n$ is uniquely emitted by one of the at least two second fronthaul network units 520, 540, and switch between outputting the at least two optical signals towards the second optical port 505. Here, according to some embodiments, the switching may be based on time slots that has been allocated to each of the at least two second fronthaul network units 520, 540 by the first fronthaul network unit 501.

Figure 12:
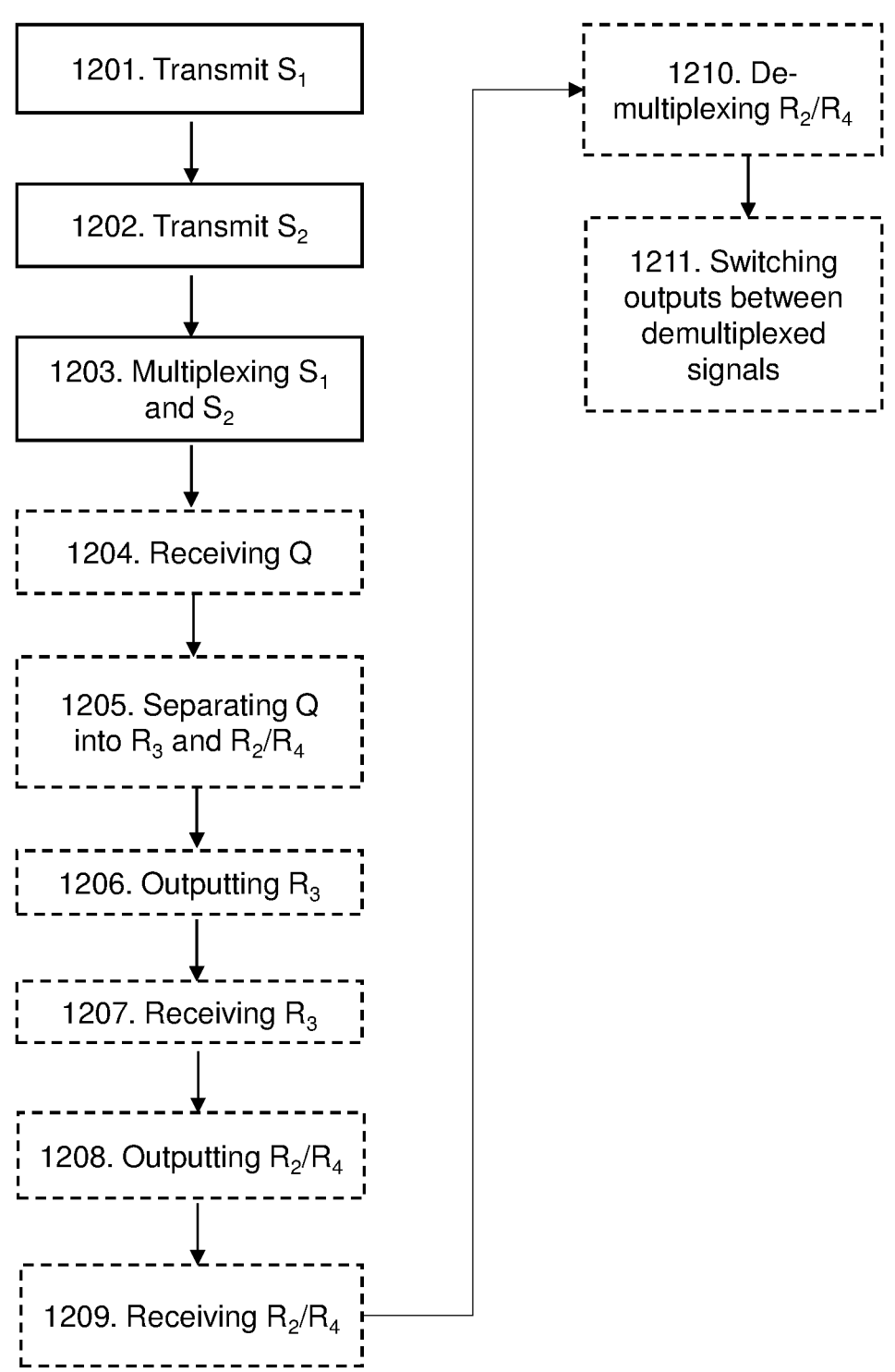
FIG. 12 is a flowchart depicting embodiments of a method in a first fronthaul network unit.

Examples of embodiments of a method performed by a first fronthaul network unit 501 for enabling synchronization with at least two second fronthaul network units 520, 540 over a single optical fiber 510 in a fronthaul network 500, will now be described with reference to the flowchart depicted in FIG. 12. FIG. 12 is an illustrated example of actions or operations which may be taken by a first fronthaul network unit 501 in the fronthaul network 100 as described below with reference to FIGS. 10-11. The method may comprise the following actions.

Action 1201. In the DL direction, the first fronthaul network unit 501 transmits DL radio data traffic intended for one or more of the at least two second fronthaul network units 520, 540 using a first optical port 504 that outputs a first optical signal $S_1$ having a first optical wavelength $\lambda_1$.

Action 1202. Also in the DL direction, the first fronthaul network unit 501 transmits packet-based synchronization messages to the at least two second fronthaul network units 520, 540 using a second optical port 505 that outputs an second optical signal $S_2$ having a second optical wavelength $\lambda_2$, wherein the second optical wavelength $\lambda_2$ is different from the first optical wavelength $\lambda_1$. Actions 1201-1202 may, for example, be performed by the SWR 503 in the first fronthaul network unit 501 as shown in FIGS. 10-11. Here, it should also be noted that the packet-based synchronization messages may be timestamped data packets according to a packet-based synchronization protocol used for synchronizing time and/or frequency information in the at least two second fronthaul network units 520, 540.

Action 1203. After the transmissions in Actions 1201-1202, the first fronthaul network unit 501 multiplexes the first optical signal $S_1$ from the first optical port 504 and the second optical signal $S_2$ from the second optical port 505 onto the same single optical fiber 510 towards the at least two second fronthaul network units 520, 540. This Action 1203 may, for example, be performed by the passive optical filter 506 in the first fronthaul network unit 501 as shown in FIG. 10, or optionally, by the multiplexer 506a in FIG. 11.

Action 1204. In the DL direction, the first fronthaul network unit 501 may receive a third optical signal Q on the same single optical fiber 510.

Action 1205. After receiving the third optical signal Q in Action 1204, the first fronthaul network unit 501 may separate the received third optical signal Q into a fourth optical signal $R_3$ carrying uplink, UL, radio data traffic having a third optical wavelength $\lambda_6$ and a fifth optical signal $R_2$; $R_4$ carrying packet-based synchronization messages having a fourth optical wavelength $\lambda_5$, wherein the third optical wavelength $\lambda_6$ is different from the fourth optical wavelength $\lambda_5$. According to some embodiments, the second optical wavelength $\lambda_2$ may the same wavelength as the fourth optical wavelength $\lambda_5$, and wherein the first optical wavelength $\lambda_1$ is the same wavelength as the third optical wavelength $\lambda_6$.

Action 1206. The first fronthaul network unit 501 may then output the fourth optical signal $R_3$ towards the first optical port 504. Actions 1204-1206 may, for example, be performed by the passive optical filter 506 in the first fronthaul network unit 501 as shown in FIG. 10, or optionally, by the de-multiplexer 506d in FIG. 11.

Action 1207. The first fronthaul network unit 501 may then also receive the fourth optical signal $R_3$ via the first optical port 504. This action 1207 may, for example, be performed by the SWR 503 in the first fronthaul network unit 501 as shown in FIGS. 10-11.

Action 1208. The first fronthaul network unit 501 may further output the fifth optical signal $R_2$; $R_4$ towards the second optical port 505. This action 1208 may, for example, be performed by the passive optical filter 506 in the first fronthaul network unit 501 as shown in FIG. 10, or optionally, by the de-multiplexer 506_d in FIG. 11.

Action 1209. The first fronthaul network unit 501 may also receive the fifth optical signal $R_2$; $R_4$ via the second optical port 505. This action 1207 may, for example, be performed by the SWR 503 in the first fronthaul network unit 501 as shown in FIGS. 10-11.

Action 1210. Optionally, the first fronthaul network unit 501 may also de-multiplex the fifth optical signal $R_2$; $R_4$ into at least two optical signals having separate optical wavelengths $\lambda_A$, $\lambda_B$, . . . , $\lambda_n$ wherein each of the separate optical wavelengths $\lambda_A$, $\lambda_B$, . . . , $\lambda_n$ is dedicated to and uniquely emitted by one of the at least two second fronthaul network units 520, 540. This action 1210 may, for example, be performed by the de-multiplexer 506d in FIG. 11. Here, it should be noted that these embodiments require the second fronthaul network unit 520, 540 in the fronthaul network 500 needs to be configured with its own dedicated and uniquely transmitted optical wavelength for transmitting packet-based synchronization messages in the fronthaul network 500, such as, e.g. the second fronthaul network unit 520 transmitting the packet-based synchronization messages on the dedicated wavelength $\lambda_A$, while the second fronthaul network unit 540 is transmitting the dedicated wavelength $\lambda_B$, as shown in FIG. 11.

Action 1211. After the demultiplexing in Action 1210, the first fronthaul network unit 501 may also switch between outputting the at least two de-multiplexed optical signals towards the second optical port 505. This action 1211 may, for example, be performed by the optical switch 506e in FIG. 11 under the control of the SWR 503. In some embodiments, the switching may be based on time slots that has been allocated to each of the at least two second fronthaul network units 520, 540 by the first fronthaul network unit 501.

Further Aspects of Embodiments

As for the above mentioned embodiments, it is also an object of the embodiments described below in the following to improve synchronization in fronthaul networks.

According to first aspect of these embodiments, this object is addressed by a method performed by a first fronthaul network unit for enabling synchronization with second fronthaul network units over a single optical fiber in a fronthaul network. The first fronthaul network unit obtains a first transmission time frame for packet-based synchronization messages transmitted on a dedicated optical wavelength over the single optical fiber in the fronthaul network. The first fronthaul network unit also obtains information indicating an identity of each of the second fronthaul network units in the fronthaul network. Further, the first fronthaul network unit allocates a time slot for packet-based synchronization messages in a second transmission time frame to one or more of the second fronthaul network units based on the obtained information. The first fronthaul network unit also transmits information indicating the second transmission time frame and the allocated time slots to the second fronthaul network units.

According to second aspect of these embodiments, this object is addressed by a first fronthaul network unit for enabling synchronization with second fronthaul network units over a single optical fiber in a fronthaul network. The first fronthaul network unit is configured to obtain a first transmission time frame for packet-based synchronization messages transmitted on a dedicated optical wavelength over the single optical fiber in the fronthaul network. The first fronthaul network unit is also configured to obtain information indicating an identity of each of the second fronthaul network units in the fronthaul network. The first fronthaul network unit is further configured to allocate a time slot for packet-based synchronization messages in a second transmission time frame to one or more of the second fronthaul network units based on the obtained information. Also, the first fronthaul network unit is further configured to transmit information indicating the second transmission time frame and the allocated time slots to the second fronthaul network units.

According to third aspect of these embodiments, this object is addressed by a method performed by a second fronthaul network unit for enabling synchronization with a first fronthaul network unit over a single optical fiber in a fronthaul network. The second fronthaul network unit obtains information indicating a transmission time frame for packet-based synchronization messages transmitted on a dedicated optical wavelength over the single optical fiber in the fronthaul network, and a time slot in the transmission time frame allocated to the second fronthaul network unit for transmitting packet-based synchronization messages to the first fronthaul network unit on the dedicated optical wavelength over the single optical fiber in the fronthaul network. Also, the second fronthaul network unit transmits, to the first fronthaul network unit, an uplink, UL, packet-based synchronization message in the time slot in the transmission time frame allocated to the second fronthaul network unit over the single optical fiber in the fronthaul network on the dedicated optical wavelength.

According to fourth aspect of these embodiments, this object is addressed by a second fronthaul network unit for synchronization with a first fronthaul network unit over a single optical fiber in a fronthaul network. The second fronthaul network unit is being configured to obtain information indicating a transmission time frame for packet-based synchronization messages transmitted on a dedicated optical wavelength over the single optical fiber in the fronthaul network, and a time slot in the transmission time frame allocated to the second fronthaul network unit for transmitting packet-based synchronization messages to the first fronthaul network unit on the dedicated optical wavelength over the single optical fiber in the fronthaul network. The second fronthaul network unit is further configured to transmit, to the first fronthaul network unit, an uplink, UL, packet-based synchronization message in the time slot in the transmission time frame allocated to the second fronthaul network unit over the single optical fiber in the fronthaul network on the dedicated optical wavelength.

According to a fifth aspect of these embodiments, computer programs configured to perform the methods described above are also provided. Further, according to a sixth aspect of these embodiments, carriers configured to carry the computer programs configured for performing the methods described above are also provided.

By allocating and distributing time slots for transmission of packet-based synchronization messages in a second transmission time frame to each of the identified second fronthaul network units in the fronthaul network, based on a first transmission time frame and the identities of the second fronthaul network units, the first fronthaul network unit advantageously provides a collision-free time distribution for packet-based synchronization messages in the fronthaul network wherein the packet-based synchronization messages are transmitted on a separate and dedicated optical wavelength, i.e. a common optical channel, that is shared by all second fronthaul network units in the fronthaul network. While this enables a very high synchronization accuracy between the first fronthaul network unit and the second fronthaul network units in the fronthaul network, it also provides for RAN/radio data traffic to be transmitted on other wavelength(s) over the same single optical fiber in order to benefit from statistical multiplexing gains, and utilize the capacity of the optical ports in the fronthaul network more efficiently.

Examples of embodiments of a method performed by a first fronthaul network unit 501 for enabling synchronization with second fronthaul network units 520, 540 over a single optical fiber 510 in a fronthaul network 500, will now be described with reference to the flowchart depicted in FIG. 13. FIG. 13 is an illustrated example of actions or operations which may be taken by a first fronthaul network unit 501 in the fronthaul network 500 as described below with reference to FIG. 19. The method may comprise the following actions. Action 1301

The first fronthaul network unit 501 obtains a first transmission time frame $T_{sync}$ for packet-based synchronization messages transmitted on a dedicated optical wavelength $\lambda_5$ over the single optical fiber 510 in the fronthaul network 500. This means that the first fronthaul network unit 501 may be configured with a manual or default setting or configuration indicating a set or default transmission time frame $T_{sync}$ that may be used to transmit packet-based synchronization messages on a dedicated optical wavelength $\lambda_5$ over the single optical fiber 510 towards the second fronthaul network units 520, 540 in the fronthaul network 500. As will become apparent by the embodiments described below, this may further be useful in case of having an automatic discovery procedure that is performed "in-band", or partly "out-of-band", for the second fronthaul network units 520, 540. "In-band" here refers to that the discovery procedure occurs on the dedicated optical wavelength $\lambda_5$ over the single optical fiber 510, i.e. over a common optical sync connection, whereas "out-of-band" refers to that the discovery procedure occurs on a separate optical wavelength $\lambda_6$ that is different from the dedicated optical wavelength $\lambda_5$ over the single optical fiber 510, i.e. over a radio data traffic connection. It should here also be noted that, in case of having a manual discovery procedure, or an automatic discovery procedure that is performed fully "out-of-band" for the second fronthaul network units 520, 540, the obtaining of the first transmission time frame $T_{sync}$ may be performed simultaneously or after the obtaining of the identity of each of the second fronthaul network units 520, 540 in the fronthaul network 500 as described in Action 1302. In this case, the first transmission time frame $T_{sync}$ will be the same as the second transmission time frame $T'_{sync}$, since the number and identities of the second fronthaul network units 520, 540 in the fronthaul network 500 is known prior to any transmission of packet-based synchronization messages on the dedicated optical wavelength $\lambda_5$ over the single optical fiber 510 towards the second fronthaul network units 520, 540 in the fronthaul network 500. In some embodiments, the packet-based synchronization messages may comprise time-stamped data packets according to a packet-based synchronization protocol used for synchronizing time and/or frequency information in the second fronthaul network units 520, 540 with time and/or frequency information in the first fronthaul network unit 501. This means, for example, that messages described in the Precision Time Protocol, PTP, according to IEEE 1588-2008 may be used.

Action 1302

The first fronthaul network unit 501 further obtains information indicating an identity of each of the second fronthaul network units 520, 540 in the fronthaul network 500. In order to be able to synchronize with the second fronthaul network units 520, 540 over the fronthaul network 550, the first fronthaul network unit 501 must be informed about the identity of each of the second fronthaul network units 520, 540 in the fronthaul network 500.

In some embodiments, the first fronthaul network unit 501 may receive the information indicating an identity of each of the second fronthaul network units 520, 540 directly via a configuration set in the first fronthaul network unit 501. This may be referred to as a manual discovery procedure, since the identities of the second fronthaul network units 520, 540 may be manually configured or set in the first fronthaul network unit 501. The identities of the second fronthaul network units 520, 540 may here, for example, be clock-IDs or MAC-addresses.

In some embodiments, the first fronthaul network unit 501 may transmit, to each of the second fronthaul network units 520, 540 over the single optical fiber 510 in the fronthaul network 500 on the dedicated optical wavelength $\lambda_5$ or on a separate optical wavelength $\lambda_6$ other than the dedicated optical wavelength $\lambda_5$, information indicating that each of the second fronthaul network units 520, 540 is to transmit the information indicating its identity to the first fronthaul network unit 501 over the single optical fiber 510 in the fronthaul network 500 on the separate optical wavelength $\lambda_6$. In case the information is received on a separate optical wavelength $\lambda_6$ other than the dedicated optical wavelength $\lambda_5$, this may be referred to as an automatic discovery procedure performed "out-of-band" for the second fronthaul network units 520, 540, since the identities of the second fronthaul network units 520, 540 are obtained at outside of, or without using, the dedicated optical wavelength $\lambda_5$, i.e. the common optical sync connection. However, in case the information is received on the dedicated optical wavelength $\lambda_5$, this may be referred to as an automatic discovery procedure performed semi-"out-of-band" for the second fronthaul network units 520, 540, since the dedicated optical wavelength $\lambda_5$, i.e. the common optical sync connection, is used to transmit a packet-based synchronization message, such as, e.g. a PTP announcement message, to obtain the identities of the second fronthaul network units 520, 540. In some embodiments, the first fronthaul network unit 501 may receive the information indicating an identity of each of the second fronthaul network units 520, 540 from each of the second fronthaul network units 520, 540 over the single optical fiber 510 in the fronthaul network 500 on a separate optical wavelength $\lambda_6$ other than the dedicated optical wavelength $\lambda_5$. For example, the second fronthaul network unit 520, 540 may here transmit a discovery message to the fronthaul network unit 501 via the separate optical wavelength $\lambda_6$, e.g. the radio data traffic connection, identifying itself with at least a clock-ID or MAC-address. This may, for example, be performed using an eCPRI or O-RAN Management channel or the conventional Control/OAM channel. In the latter case, the second fronthaul network units 520, 540 may also use the OAM address of the first fronthaul network unit 501 comprised in the received packet-based synchronization message, such as, e.g. a PTP announcement message, to transmit the discovery message. Here, in some embodiments, the first fronthaul network unit 501 may also transmit an acknowledgment message of the received the information indicating the identity of each of the second fronthaul network units 520, 540 to each of the second fronthaul network units 520, 540 over the single optical fiber 510 in the fronthaul network 500 on the separate optical wavelength $\lambda_6$. This means that the first fronthaul network unit 501 may acknowledge a successful reception of the identities of the second fronthaul network units 520, 540 to the second fronthaul network units 520, 540 using the separate optical wavelength $\lambda_6$, e.g. a radio data traffic connection.

In some embodiments, the first fronthaul network unit 501 may transmit, to the second fronthaul network units 520, 540 over the single optical fiber 510 in the fronthaul network 500 on the dedicated optical wavelength $\lambda_5$, information indicating that the second fronthaul network units 520, 540 are to transmit the information indicating their identity to the first fronthaul network unit 501 over the single optical fiber 510 in the fronthaul network 500 on the dedicated optical wavelength $\lambda_5$. This may be referred to as an automatic discovery procedure performed "in-band" for the second fronthaul network units 520, 540, since only the dedicated optical wavelength $\lambda_5$, i.e. the common optical sync connection, is used to obtain the identities of the second fronthaul network units 520, 540. Here, in some embodiments, the first fronthaul network unit 501 may also transmit information indicating at least one allocated discovery time slot $t_{disc}$ in the second transmission time frame $T'_{sync}$ for the second fronthaul network units 520, 540 to transmit the information indicating their identities to the first fronthaul network unit 501. This means the first network unit 501 may indicate to each of the second fronthaul network units 520, 540 when they may transmit a discovery message comprising their respective identity to the first network unit 501 on the dedicated optical wavelength $\lambda_5$, i.e. the common optical sync connection. In other words, the first fronthaul network unit 501 may announce an auto-discovery scheme and time slot where each new second fronthaul network units 520, 540 may announce their presence up to the first fronthaul network unit 501 using the dedicated optical wavelength $\lambda_5$, i.e. the common optical sync connection. According to some embodiments, the first fronthaul network unit 501 may here receive the information indicating an identity of at least one second fronthaul network unit 520, 540 from at least one second fronthaul network unit 520, 540 in the at least one allocated discovery time slot $t_{disc}$ of the second transmission time frame $T'_{sync}$ over the single optical fiber 510 in the fronthaul network 500 on the dedicated optical wavelength $\lambda_5$. This means that the first network unit 501 may receive the identities of each of the second fronthaul network units 520, 540 in the fronthaul network 500 on the dedicated optical wavelength $\lambda_5$, i.e. the common optical sync connection. Additionally, in some embodiments, the first fronthaul network unit 501 may here further transmit information to be used by each of the second fronthaul network units 520, 540 to determine an identity in the fronthaul network 500, wherein the determined identity indicate which of the allocated discovery time slots $t_{disc}$ to use for transmitting the determined identity to the first fronthaul network unit 501. This means that the first network unit 501 may transmit information enabling each of the second fronthaul network units 520, 540 to determine a unique identity in the fronthaul network 500 that will also identify when each of the second fronthaul network units 520, 540 should transmit its identity to the first network unit 501. One example of an automatic discovery procedure performed "in-band" for the second fronthaul network units 520, 540 is shown in and described below with reference to FIG. 17.

Furthermore, in some embodiments, the first fronthaul network unit 501 may obtain information indicating that at least two of the second fronthaul network units 520, 540 have determined the same identity in the fronthaul network 500 and are transmitting their determined identities to the first fronthaul network unit 501 in the same allocated discovery time slot $t_{disc}$. Here, in some embodiments, the first fronthaul network unit 501 may also transmit information to the at least two of the second fronthaul network units 520, 540 indicating to one of the at least two of the second fronthaul network units to transmit the determined identity to the first fronthaul network unit 501 in another one of the allocated discovery time slots $t_{disc}$. This means that a potential conflict due to two second fronthaul network unit 520, 540 arriving at the same identity and thus transmitting their identities in the same discovery time slot $t_{disc}$ may be resolved. One example of how to resolve conflicts between discovery messages when the second fronthaul network units 520, 540 have arrived at the same identity and transmits in the same discovery time slot $t_{disc}$ is shown in and described below with reference to FIG. 18.

Action 1303

After obtaining the information in Actions 1301-1302, the first fronthaul network unit 501 allocates a time slot $t_{sync}$ for packet-based synchronization messages in a second transmission time frame $T'_{sync}$ to one or more of the second fronthaul network units 520, 540 based on the obtained information. Since there is a dedicated optical wavelength $\lambda_5$, i.e. a common optical sync connection, for the packet-based synchronization messages to be transmitted on over the single optical fiber 510 to all second fronthaul network units in the fronthaul network 500, e.g. the second fronthaul network units 520, 540, each of the second fronthaul network units 520, 540 needs to be allocated or assigned a specific time slot in UL direction on the dedicated optical wavelength $\lambda_5$, i.e. the common optical sync connection, in which the second fronthaul network units 520, 540 may transmit packet-based synchronization messages, e.g. perform their specific IEEE1588 measurements and adaptation procedures. Otherwise, there will be collisions occurring between the packet-based synchronization messages transmitted from the second fronthaul network units 520, 540 on the dedicated optical wavelength $\lambda_5$, i.e. the common optical sync connection. Here, it should also be noted that the second transmission time frame $T'_{sync}$ may be different than the first transmission time frame $T_{sync}$ in case, for example, the number and identities of the second fronthaul network units 520, 540 in the fronthaul network 500 is not known prior to obtaining the information in Actions 1301-1302.

In some embodiments, the first fronthaul network unit 501 may determine the second transmission time frame $T'_{sync}$ based on the obtained information in Actions 1301-1302. For some embodiments the first transmission time frame $T_{sync}$ may be determined to be the same as the second transmission time frame $T'_{sync}$, however, for some embodiments, the first transmission time frame $T_{sync}$ may be different from the second transmission time frame $T'_{sync}$. The latter is true for the embodiments described above in which there is an automated discovery procedure which dynamically determined the number of, and identities of, the second fronthaul network units 520, 540 in the fronthaul network 500. Here, according to some embodiments, the second transmission time frame $T'_{sync}$ may be determined based on one of more of: a periodicity of packet-based synchronization messages in the fronthaul network 500, a required guard period, and the number of second fronthaul network units 520, 540 in the fronthaul network 500. According to some embodiments, the first fronthaul network unit 501 may perform the allocation of the time slots $t_{sync}$ for packet-based synchronization messages based on the number of second fronthaul network units 520, 540 in the fronthaul network 500, and/or on an request from one or more of the second fronthaul network units 520, 540. One illustrative example of packet-based synchronization messages transmitted in UL and DL between the first fronthaul network unit 501 and the second fronthaul network units 520, 540 in allocated time slots $t_{sync}$ of a second transmission time frame $T'_{sync}$ is shown in and described below with reference to FIG. 15.

Action 1304

After the allocation in Action 1303, the first fronthaul network unit 501 may transmit information indicating the second transmission time frame $T'_{sync}$ and the allocated time slots $t_{sync}$ to the second fronthaul network units 520, 540. This means that the first fronthaul network unit 501 provides the second fronthaul network units 520, 540 with a Time-Division Multiplexing, TDM, frame format, i.e. the second transmission time frame $T'_{sync}$, for UL transmissions of packet-based synchronization messages on the dedicated optical wavelength $\lambda_5$, i.e. the common optical sync connection, that is to be used by the second fronthaul network units 520, 540 for synchronization with the first fronthaul network unit 501 over the single optical fiber 510 in the fronthaul network 500. It also means that the first fronthaul network unit 501 provides each of the second fronthaul network units 520, 540 with their respectively allocated time-slots for UL transmissions of packet-based synchronization messages in the TDM frame format. The information may, for example, be communicated via a Type Length Value, TLV, information element, IE, in a packet-based synchronization message, such as, e.g. a PTP Sync message.

According to some embodiments, the first fronthaul network unit 501 may perform the transmission of the information indicating the second transmission time frame $T_{sync}$ and the allocated time slots $t_{sync}$ over the single optical fiber 510 in the fronthaul network 500 on the separate optical wavelength $\lambda_6$. This means, for example, that the first fronthaul network unit 501 may use a common management channel on the separate optical wavelength $\lambda_6$, i.e. a radio data traffic connection, such as, a eCPRI or O-RAN Management channel, for the transmission of the transmission time frame $T_{sync}$, $T'_{sync}$ and the time slot $t_{sync}$ to the second fronthaul network units 520, 540 over the single optical fiber 510 in the fronthaul network 500. According to another option, the first fronthaul network unit 501 may here use the conventional Control/OAM channel on the separate optical wavelength $\lambda_6$, i.e. a radio data traffic connection, for the transmission of the transmission time frame $T_{sync}$, $T'_{sync}$ and the time slot $t_{sync}$ to the second fronthaul network units 520, 540 over the single optical fiber 510 in the fronthaul network 500.

Optionally, according to some embodiments, the first fronthaul network unit 501 may perform the transmission of the information indicating the second transmission time frame $T_{sync}$ and the allocated time slots $t_{sync}$ is performed over the single optical fiber 510 in the fronthaul network 500 on the dedicated optical wavelength $\lambda_5$ via a packet-based synchronization message. This means that the first fronthaul network unit 501 may use a packet-based synchronization message on the dedicated optical wavelength $\lambda_5$, i.e. the common optical sync connection, for the transmission of the transmission time frame $T_{sync}$, $T'_{sync}$ and the time slot $t_{sync}$ the second fronthaul network units 520, 540 over the single optical fiber 510 in the fronthaul network 500. In some embodiments, the first fronthaul network unit 501 may further allocate a starting time slot $t_{start}$ for DL packet-based synchronization messages in the second transmission time frame $T'_{sync}$ to the second fronthaul network units 520, 540. In this case, the first fronthaul network unit 501 may also transmit, to the second fronthaul network units 520, 540 in the allocated starting time slot $t_{start}$ of the second transmission time frame $T'_{sync}$ on the dedicated optical wavelength $\lambda_5$, DL packet-based synchronization messages comprising the information indicating the second transmission time frame $T'_{sync}$ and the allocated time slots $t_{sync}$. Here, in some embodiments, the DL packet-based synchronization messages to the second fronthaul network units 520, 540 in the allocated starting time slot $t_{start}$ may comprise a PTP Sync message. This is further illustrated in and described below with reference to FIGS. 15-17.

Action 1305

The first fronthaul network unit 501 may also receive UL packet-based synchronization messages from one or more of the second fronthaul network units 520, 540 in the allocated time slots $t_{sync}$ of the second transmission time frame $T'_{sync}$ on the dedicated optical wavelength $\lambda_5$. This means that first fronthaul network unit 501 and the second fronthaul network units 520, 540 may transmit packet-based synchronization messages, e.g. perform their specific IEEE1588 measurements and adaptation procedures, on the dedicated optical wavelength $\lambda_5$, i.e. the common optical sync connection, over the single optical fiber 510 in the fronthaul network 500. Here, in some embodiments, the UL packet-based synchronization messages from one or more of the second fronthaul network units 520, 540 in the allocated time slots $t_{sync}$ may comprise a PTP Delay_Request message. This is further illustrated in and described below with reference to FIGS. 15-17.

Action 1306

In response to the received UL synchronization messages in Action 1305, the first fronthaul network unit 501 may further transmit DL packet-based synchronization messages to the one or more of the second fronthaul network units 520, 540 i on the dedicated optical wavelength $\lambda_2$. This also means that first fronthaul network unit 501 and the second fronthaul network units 520, 540 may transmit packet-based synchronization messages, e.g. perform their specific IEEE1588 measurements and adaptation procedures, on the dedicated optical wavelength $\lambda_5$, i.e. the common optical sync connection, over the single optical fiber 510 in the fronthaul network 500. The DL packet-based synchronization messages may be transmitted as soon as possible from the first fronthaul network 501 in response to the transmitted UL synchronization message, such as, e.g. in the same time slot $t_{sync}$ in the transmission time frame $T_{sync}$, $T'_{sync}$. Here, in some embodiments, the DL synchronization messages to the one or more of the second fronthaul network units 520, 540 may comprise a PTP Delay_Response message. This is further illustrated in and described below with reference to FIGS. 15-17.

Figure 14:
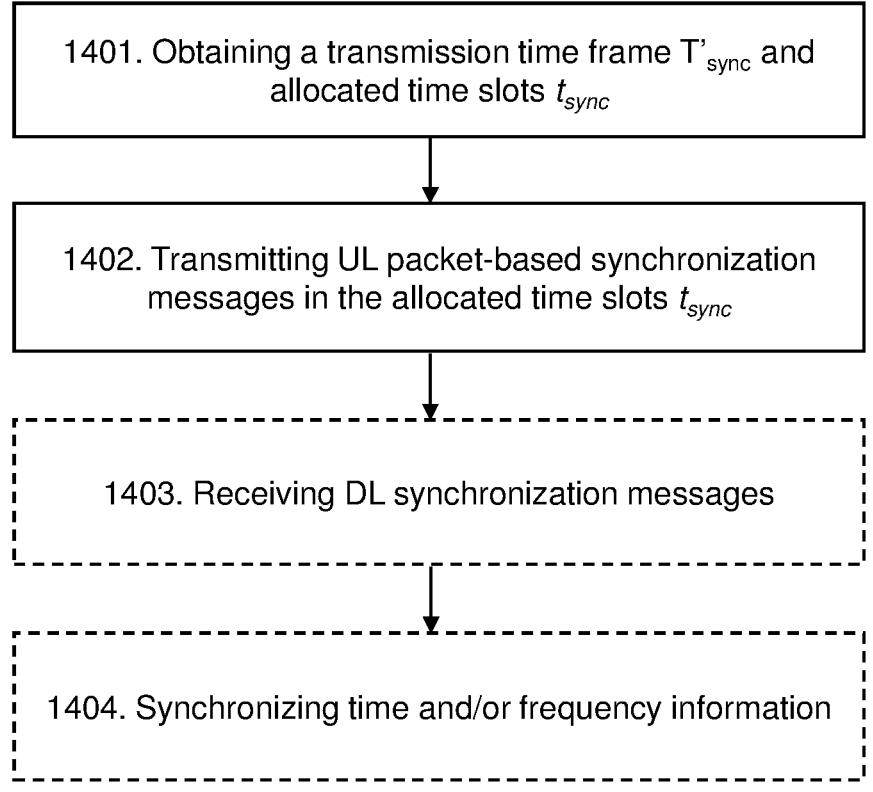
FIG. 14 is another flowchart depicting embodiments of a method in a second fronthaul network unit.

Examples of embodiments of a method performed by a second fronthaul network unit 520, 540 for enabling synchronization with a first fronthaul network unit 501 over a single optical fiber 510 in a fronthaul network 500, will now be described with reference to the flowchart depicted in FIG. 14. FIG. 14 is an illustrated example of actions or operations which may be taken by a second fronthaul network unit 520, 540 in the fronthaul network 500 as described below with reference to FIG. 20. The method may comprise the following actions.

Action 1401

The second fronthaul network unit 520, 540 obtains information indicating a transmission time frame $T_{sync}$, $T'_{sync}$ for packet-based synchronization messages transmitted on a dedicated optical wavelength $\lambda_5$ over the single optical fiber 510 in the fronthaul network 500, and information indicating a time slot $t_{sync}$ in the transmission time frame $T_{sync}$, $T'_{sync}$ allocated to the second fronthaul network unit 520, 540 for transmitting packet-based synchronization messages to the first fronthaul network unit 501 on the dedicated optical wavelength $\lambda_5$ over the single optical fiber 510 in the fronthaul network 500. This means that the second fronthaul network units 520, 540 is provided with a Time-Division Multiplexing, TDM, frame format, i.e. the transmission time frame $T'_{sync}$, for UL transmissions of packet-based synchronization messages on the dedicated optical wavelength $\lambda_5$, i.e. the common optical sync connection, that is to be used by the second fronthaul network units 520, 540 for synchronization with the first fronthaul network unit 501 over the single optical fiber 510 in the fronthaul network 500. It also means that the second fronthaul network unit 520, 540 is provided with an allocated time-slot for UL transmissions of packet-based synchronization messages in the TDM frame format. This advantageously avoids collisions between packet-based synchronization messages transmitted from the second fronthaul network units 520, 540 on the dedicated optical wavelength $\lambda_5$, i.e. the common optical sync connection, in the fronthaul network 500.

In some embodiments, the second fronthaul network unit 520, 540 may receives the information indicating the transmission time frame $T_{sync}$, $T'_{sync}$ and the time slot $t_{sync}$ directly via a configuration set in the second fronthaul network unit 520, 540. This means that the second fronthaul network unit 520, 540 may be configured with a manual or default setting or configuration indicating a set or default transmission time frame $T_{sync}$, $T'_{sync}$ and a set or default allocated time slot $t_{sync}$ that may be used to transmit packet-based synchronization messages on a dedicated optical wavelength $\lambda_5$ over the single optical fiber 510 towards first fronthaul network unit 501 in the fronthaul network 500.

In some embodiments, the second fronthaul network unit 520, 540 may receives the information indicating the transmission time frame $T_{sync}$, $T'_{sync}$ and the time slot $t_{sync}$ over the single optical fiber 510 in the fronthaul network 500 on a separate optical wavelength $\lambda_6$ other than the dedicated optical wavelength $\lambda_5$. This means, for example, that the second fronthaul network unit 520, 540 may use a common management channel on the separate optical wavelength $\lambda_6$, i.e. a radio data traffic connection, such as, a eCPRI or O-RAN Management channel, in order to receive the transmission time frame $T_{sync}$, $T'_{sync}$ and the time slot $t_{sync}$ from the first fronthaul network unit 501 over the single optical fiber 510 in the fronthaul network 500. According to another option, the first fronthaul network unit 501 may here use the conventional Control/OAM channel on the separate optical wavelength $\lambda_6$, i.e. a radio data traffic connection, in order to receive the transmission time frame $T_{sync}$, $T'_{sync}$ and the time slot $t_{sync}$ from the first fronthaul network unit 501 over the single optical fiber 510 in the fronthaul network 500.

In some embodiments, the second fronthaul network unit 520, 540 may receives the information indicating the transmission time frame $T_{sync}$, $T'_{sync}$ and the time slot $t_{sync}$ over the single optical fiber 510 in the fronthaul network 500 on the dedicated optical wavelength $\lambda_5$ via a packet-based synchronization message. This means that the second fronthaul network unit 520, 540 may use a packet-based synchronization message on the dedicated optical wavelength $\lambda_5$, i.e. the common optical sync connection, in order to receive the transmission time frame $T_{sync}$, $T'_{sync}$ and the time slot $t_{sync}$ from the first fronthaul network unit 501 over the single optical fiber 510 in the fronthaul network 500. The information may, for example, be communicated via a Type Length Value, TLV, message field or information element, IE, in a packet-based synchronization message, such as, PTP Sync message. In some embodiments, the second fronthaul network unit 520, 540 may receive, from the first fronthaul network unit 501 in a starting time slot $t_{start}$ of the transmission time frame $T_{sync}$, $T'_{sync}$ over the single optical fiber 510 in the fronthaul network 500 on the dedicated optical wavelength $\lambda_5$, a downlink, DL, packet-based synchronization message comprising the information indicating the transmission time frame $T_{sync}$, $T'_{sync}$ and the time slot $t_{sync}$. Here, in some embodiments, the DL packet-based synchronization messages from the first fronthaul network unit 501 in the allocated starting time slot $t_{start}$ may comprise a PTP Sync message. This is further illustrated in and described below with reference to FIGS. 15-17.

Furthermore, according to some embodiments, the second fronthaul network unit 520, 540 may receive, from the first fronthaul network unit 501 over the single optical fiber 510 in the fronthaul network 500 on the dedicated optical wavelength $\lambda_5$ or on a separate optical wavelength $\lambda_6$ other than the dedicated optical wavelength $\lambda_5$, information indicating that the second fronthaul network unit 520, 540 is to transmit information indicating its identity to the first fronthaul network unit 501 over the single optical fiber 510 in the fronthaul network 500 on the separate optical wavelength $\lambda_6$. In case the information is received on a separate optical wavelength $\lambda_6$ other than the dedicated optical wavelength $\lambda_5$, this may be referred to as an automatic discovery procedure performed "out-of-band" for the second fronthaul network units 520, 540, since the identities of the second fronthaul network units 520, 540 are obtained at outside of, or without using, the dedicated optical wavelength $\lambda_5$, i.e. the common optical sync connection. However, in case the information is received on the dedicated optical wavelength $\lambda_5$, this may be referred to as an automatic discovery procedure performed semi-"out-of-band" for the second fronthaul network units 520, 540, since the dedicated optical wavelength $\lambda_5$, i.e. the common optical sync connection, is used to transmit a packet-based synchronization message, such as, e.g. a PTP announcement message, to obtain the identities of the second fronthaul network units 520, 540.

In response to the received information, the second fronthaul network unit 520, 540 may, in some embodiments, transmit information indicating an identity of the second fronthaul network unit 520, 540 to first fronthaul network unit 501 over the single optical fiber 510 in the fronthaul network 500 on a separate optical wavelength $\lambda_6$ other than the dedicated optical wavelength $\lambda_5$. For example, the second fronthaul network unit 520, 540 may here transmit a discovery message to the fronthaul network unit 501 via the separate optical wavelength $\lambda_6$, e.g. the radio data traffic connection, identifying itself with at least a clock-ID or MAC-address. This may, for example, be performed using an eCPRI or O-RAN Management channel or the conventional Control/OAM channel. In the latter case, the second fronthaul network units 520, 540 may also use the OAM address of the first fronthaul network unit 501 comprised in the received packet-based synchronization message, such as, e.g. a PTP Announcement message, to transmit the discovery message. Also, in some embodiments, the second fronthaul network unit 520, 540 may receive an acknowledgement message of the transmitted information indicating the identity of the second fronthaul network units 520, 540 to first fronthaul network unit 501 over the single optical fiber 510 in the fronthaul network 500 on the separate optical wavelength $\lambda_6$. This means that the fronthaul network unit 501 may confirm at safe receipt of the identity of the second fronthaul network unit 520, 540.

In some embodiments, the second fronthaul network unit 520, 540 may receives, from the first fronthaul network unit 501 over the single optical fiber 510 in the fronthaul network 500 on the dedicated optical wavelength $\lambda_5$, information indicating that the second fronthaul network unit 520, 540 is to transmit the information indicating its identity to the first fronthaul network unit 501 over the single optical fiber 510 in the fronthaul network 500 on the dedicated optical wavelength $\lambda_5$. This may be referred to as an automatic discovery procedure performed "in-band" for the second fronthaul network units 520, 540, since only the dedicated optical wavelength $\lambda_5$, i.e. the common optical sync connection, is used to obtain the identities of the second fronthaul network units 520, 540. Here, the second fronthaul network unit 520, 540 may, in some embodiments, also receive information indicating at least one discovery time slot $t_{disc}$ in the transmission time frame $T_{sync}$, $T'_{sync}$ allocated to the second fronthaul network unit 520, 540 to transmit the information indicating its identity to the first fronthaul network unit 501. This means the second fronthaul network units 520, 540 may be informed when it may transmit a discovery message comprising its identity to the first network unit 501 on the dedicated optical wavelength $\lambda_5$, i.e. the common optical sync connection. In other words, the first fronthaul network unit 501 may announce an auto-discovery scheme and time slot where each new second fronthaul network units 520, 540 may announce their presence in the fronthaul network 500 up to the first fronthaul network unit 501 using the dedicated optical wavelength $\lambda_5$, i.e. the common optical sync connection. Here, according to some embodiments, the second fronthaul network unit 520, 540 may further transmit, to the first fronthaul network unit 501, the information indicating the identity of the second fronthaul network unit 520, 540 in the allocated discovery time slot $t_{disc}$ of the transmission time frame $T_{sync}$, $T'_{sync}$ over the single optical fiber 510 in the fronthaul network 500 on the dedicated optical wavelength $\lambda_5$. This means that the first network unit 501 may receive the identities of each of the second fronthaul network units 520, 540 in the fronthaul network 500 on the dedicated optical wavelength $\lambda_5$, i.e. the common optical sync connection.

In some embodiments, the second fronthaul network unit 520, 540 may receive information to be used by the second fronthaul network unit 520, 540 in order to determine an identity in the fronthaul network 500, wherein the determined identity further indicate which of the allocated discovery time slots $t_{disc}$ to use for transmitting the determined identity to the first fronthaul network unit 501. This means that the second fronthaul network unit 520, 540 may receive information enabling the second fronthaul network unit 520, 540 to determine a unique identity in the fronthaul network 500 that will also identify when the second fronthaul network unit 520, 540 should transmit its identity to the first network unit 501. Here, according to some embodiments, the second fronthaul network unit 520, 540 may also determine an identity of the second fronthaul network unit 520, 540 in the fronthaul network 500 based on the received information. One example of an automatic discovery procedure performed "in-band" for the second fronthaul network units 520, 540 is shown in and described below with reference to FIG. 17.

Further, in some embodiments, the second fronthaul network unit 520, 540 may receive information from the first fronthaul network unit 501 indicating that the second fronthaul network unit 520, 540 is to transmit the determined identity to the first fronthaul network unit 501 in another allocated discovery time slot $t_{disc}$ than the allocated discovery time slot $t_{disc}$ indicated by the determined identity. Here, according to some embodiments, the second fronthaul network unit 520, 540 may also transmit the determined identity to the first fronthaul network unit 501 based on the received information. This means that a potential conflict due to two second fronthaul network unit 520, 540 arriving at the same identity and thus transmitting their identities in the same discovery time slot $t_{disc}$ may be resolved. One example of how to resolve conflicts between discovery messages when the second fronthaul network units 520, 540 have arrived at the same identity and transmits in the same discovery time slot $t_{disc}$ is shown in and described below with reference to FIG. 18.

Action 1402

After obtaining the information in Action 1401, the second fronthaul network unit 520, 540 transmits, to the first fronthaul network unit 501, an uplink, UL, packet-based synchronization message in the time slot $t_{sync}$ in the transmission time frame $T_{sync}$, $T'_{sync}$ allocated to the second fronthaul network unit 520, 540 over the single optical fiber 510 in the fronthaul network 500 on the dedicated optical wavelength $\lambda_5$. This means that the second fronthaul network units 520, 540 and the first fronthaul network unit 501 may transmit packet-based synchronization messages, e.g. perform their specific IEEE1588 measurements and adaptation procedures, on the dedicated optical wavelength $\lambda_5$, i.e. the common optical sync connection, over the single optical fiber 510 in the fronthaul network 500. Here, in some embodiments, the UL packet-based synchronization messages to the first fronthaul network unit 501 in the allocated time slot $t_{sync}$ may comprise a PTP Delay_Request message. This is further illustrated in and described below with reference to FIGS. 15-17.

Action 1403

In response to the transmitted UL synchronization message in Action 1402, the second fronthaul network unit 520, 540 may further receive, from the first fronthaul network unit 501, DL packet-based synchronization messages over the single optical fiber 510 in the fronthaul network 500 on the dedicated optical wavelength $\lambda_5$. This means that the second fronthaul network unit 520, 540 and the first fronthaul network unit 501 may transmit packet-based synchronization messages, e.g. perform their specific IEEE1588 measurements and adaptation procedures, on the dedicated optical wavelength $\lambda_5$, i.e. the common optical sync connection, over the single optical fiber 510 in the fronthaul network 500. The DL packet-based synchronization messages may, for example, be transmitted as soon as possible from the first fronthaul network 501 in response to the transmitted UL synchronization message, and thus be received by the second fronthaul network unit 520, 540 soon thereafter, e.g. in the same time slot $t_{sync}$ in the transmission time frame $T_{sync}$, $T'_{sync}$. Here, in some embodiments, the DL synchronization messages from the first fronthaul network unit 501 may comprise a PTP Delay_Response message. This is further illustrated in and described below with reference to FIGS. 15-17.

Action 1404

The second fronthaul network unit 520, 540 may, according to some embodiments, synchronize time and/or frequency information in the second fronthaul network unit 520, 540 based on the packet-based synchronization messages. This will enable a very high synchronization accuracy between the first fronthaul network unit 501 and the second fronthaul network units 520, 540 in the fronthaul network 500. Here, it should be noted that the packet-based synchronization messages may comprise timestamped data packets according to a packet-based synchronization protocol used for synchronizing time and/or frequency information in the second fronthaul network units 520, 540 with time and/or frequency information in the first fronthaul network unit 501. This means, for example, that messages described in the Precision Time Protocol, PTP, according to IEEE 1588-2008 may be used. However, it should also bet noted that the same principle may be applied to other non-PTP protocols.

FIG. 15 shows one illustrative example of packet-based synchronization messages transmitted in UL and DL between the first fronthaul network unit 501 and the second fronthaul network units 520, 540 in allocated time slots $t_{sync}$ of a transmission time frame $T_{sync}$, $T'_{sync}$. Here, it should be noted that although the below example uses packet-based synchronization messages according to the Precision Time Protocol, PTP, according to IEEE 1588-2008, other non-PTP protocols may also be envisioned. For the purpose of simplicity and description of this example, the following may for example be assumed for the packet-based synchronization messages:

PTP Sync messages may have a length of 44 bytes and a periodicity of 16 messages per seconds on the DL;

PTP DelayReq messages may have a length of 54 bytes and a periodicity of 16 messages per seconds on the UL;

PTP DelayResp messages may have a length of 54 bytes and a periodicity of 16 messages per seconds on the DL; and PTP Announcement messages may have a length of 64 bytes and a periodicity of 8 messages per seconds on the DL.

For the same reason, it may for this example also be assumed an additional Ethernet overhead for about 30 bytes. This means about 80 ns per message over 10 Gbps optical fiber, or 800 ns over 1 Gbps optical fiber.

In FIG. 15, the first fronthaul network unit 501 will transmit the PTP Sync messages and PTP Announcement messages in DL on the dedicated optical wavelength $\lambda_5$, i.e. the common optical sync connection, in multicast to all second fronthaul network units 520, 540 in the fronthaul network 500 in accordance with the embodiments described above with reference to FIG. 13. The second fronthaul network units 520, 540 will transmit PTP DelayReq messages in UL on the dedicated optical wavelength $\lambda_5$, i.e. the common optical sync connection, in their respectively allocated time slots, $t_{sync}$, in accordance with the embodiments described above with reference to FIG. 14 in order to prevent collisions between messages. If the number of second fronthaul network units 520, 540 is sufficiently low, such as, e.g. less or equal to 6, it may in this example be possible to apply the scheme in FIG. 15 directly; that is, at every PTP Sync message distributed from the first fronthaul network unit 501 in DL, all of the second fronthaul network units 520, 540 in the fronthaul network 500 may, at different allocated time slots $t_{sync}$ of a single transmission time frame $T_{sync}$, $T'_{sync}$, respond with their PTP DelayReq message.

In the example of FIG. 15, assuming that the transmission time frame, such as, e.g. the first and/or second transmission time frame $T_{sync}$, $T'_{sync}$, has a length of 62.5 ms (i.e. periodicity of 16 messages per second), each of the second fronthaul network units 520, 540 (here denoted from 1 to 6) will each have about 10 ms±1 ms after each PTP sync message on the DL to exchange a PTP Delay Req message and PTP DelayResp message with the first fronthaul network unit 501.

This transmission structure and order may, for example, be established by the first fronthaul network unit 501 transmitting a PTP Sync message which indicates the start of the TDM frame and a time slot assignment to each of the second fronthaul network units 520, 540 in the fronthaul network 500, e.g. via an attached Type Length Value, TLV. It should be noted that the time slot assignment for each of the second fronthaul network units 520, 540 in the fronthaul network 500 may be based on, for example, a request from one or more of the second fronthaul network units 520, 540 in the fronthaul network 500 or configured manually. An attached TLV in a PTP Sync message may comprise an identity sequence or time slot assignment that, for example, may be based on the clock-IDs of the second fronthaul network units 520, 540 in the fronthaul network 500, such as, e.g. [1 2 3 4 5 6], and the length of each time slot, e.g. 10 ms. Once the PTP sync message is received by the second fronthaul network units 520, 540 in the fronthaul network 500, each of the second fronthaul network units 520, 540 in the fronthaul network 500 may start a counter that creates a timeslot assignment according to the information in the PTP Sync message. For example, in case of the identity sequence or time slot assignment [1 2 3 4 5 6], the second fronthaul network unit 520, 540 identified by "3" would be assigned a time slot between 20 ms and 30 ms. During this assigned time slot, the second fronthaul network unit 520, 540 may send its PTP Delay Request message to the first fronthaul network unit 501 and listen to/receive a PTP Response messages from the first fronthaul network unit 501. This is illustrated in the third time slot in FIG. 15. Also, during this time slot, the other second fronthaul network unit 520, 540 will not send any data or messages, nor process any incoming PTP messages. When the TDM frame expires, such as, in this case, e.g. after about 60 ms plus guard periods, all second fronthaul network units 520, 540 in the fronthaul network 500 will again listen to incoming PTP messages from the first fronthaul network unit 501, such as, e.g. a PTP Sync message and PTP Announce message.

In some embodiments, the TLV may be attached to another specific message, such as, e.g. a PTP management or PTP signaling message. This may be advantageous in case the setup of the UL transmission requires some time due to e.g. a delay in switching on the lasers of the SFPs 522, 542 or similar. In this case, for example, the PTP management or PTP signaling message comprising the TLV may be transmitted 2 ms before the PTP Sync message. This advantageously allows for a specific second fronthaul network unit 520, 540 to already be enabled for UL transmission, i.e. up-and-ready, at the time when the PTP sync message is received. Another option to address this issue may be to send the PTP Delay Request messages with higher rate than the PTP Sync messages; this, so that at least one of the PTP Delay Request messages will be received by the first fronthaul network unit 501.

One example of a PTP message comprising a message field or Information Element, IE, having one or more TLVs is shown in Table 1 below.

TABLE 1

| Bits | | | | | | | | | |
| --- | --- | --- | --- | --- | --- | --- | --- | --- | --- |
| 7 | 6 | 5 | 4 | 3 | 2 | 1 | 0 | Octets | Offset |
| header (see 13.3) | | | | | | | | 34 | 0 |
| targetPortIdentity | | | | | | | | 10 | 34 |
| One or more TLVs | | | | | | | | M | 44 |

Another example of a PTP message comprising a message field or Information Element, IE, having one or more TLVs is shown in Table 2 below. TLV for use with PTP messages are specified in Section 14 of the standard specification IEEE1588-2008. Table 2 shows a PTP message having vendor and standard organization specific extension TLV fields which may be used by some embodiments herein.

TABLE 2

| Bits | | | | | | | | | | TLV |
| --- | --- | --- | --- | --- | --- | --- | --- | --- | --- | --- |
| 7 | 6 | 5 | 4 | 3 | 2 | 1 | 0 | Octets | Offset | |
| tlvType | | | | | | | | 2 | 0 | |
| lengthField | | | | | | | | 2 | 2 | |
| organizationId | | | | | | | | 3 | 4 | |
| organizationSubType | | | | | | | | 3 | 7 | |
| dataField | | | | | | | | N | 10 | |

FIG. 16 shows another illustrative example of packet-based synchronization messages transmitted in UL and DL between the first fronthaul network unit 501 and the second fronthaul network units 520, 540 in allocated time slots $t_{sync}$ of a transmission time frame $T_{sync}$, $T'_{sync}$. Embodiments according to this example may be useful, for example, when there is a need for larger guard periods, e.g. due to delays in switching on/off the transmission in UL, when having a larger number of second fronthaul network units 520, 540, e.g. more than 6, or when having a higher periodicity of the PTP sync messages, e.g. 64 messages per second. This example suggest a different TDM frame and time slot assignment scheme where only one or a sub-set of the second fronthaul network units 520, 540 in the fronthaul network 500 are allowed to transmit in UL between two successive PTP sync messages from the first fronthaul network unit 501. In FIG. 16, only one second fronthaul network unit 520, 540 per PTP Sync message period is enabled to send messages in UL. Also, the periodicity of the PTP Sync messages is here 64 per second, i.e. 15.625 ms.

This TDM frame and time slot assignment scheme implies a reduced transmission frequency of the PTP Delay Request and PTP Delay Response message exchanges per second fronthaul network unit 520, 540. This is in general not an issue from a timing performance perspective, as these two-way exchanges are required to estimate the delay of the link path between the second fronthaul network unit 520, 540 and the first fronthaul network unit 501 in the fronthaul network 500. However, in a static set up, i.e. where no new second fronthaul network units 520, 540 are added in the fronthaul network 500, it is not expected to require any frequent calculations, since there is no need for continuous link measurements. It may, however, but may result in a potentially slight longer settling time at the start-up of the fronthaul network 500. However, a few more seconds at the start or configuration of the fronthaul network 500 will not impact the overall operation of the fronthaul network 500. The first fronthaul network unit 501 may in this case also inform the second fronthaul network units 520, 540 when they are allowed or not to transmit in the UL, e.g. a TLV attached to a specific sync message may inform which one(s) of the second fronthaul network units 520, 540, and in case of more than one also in which order, are enabled to exchange PTP Delay Request and PTP Delay Response message with the first fronthaul network unit 501 in the allocated time slot $t_{sync}$ of transmission time frame $T_{sync}$, $T'_{sync}$.

It should be noted that the low bit rate channels on the dedicated optical wavelength $\lambda_5$, i.e. the common optical sync connection, for the PTP message enable this "loose PTP synchronization" approach as described above with reference to the example in FIGS. 15-16 with the first fronthaul network unit 501 controlling the order of the data transmissions in UL from the second fronthaul network units 520, 540. In other words, a sort of pseudo-TDM allocation that does not require very strict timing between the first fronthaul network unit 501 and the second fronthaul network units 520, 540 is enabled.

As indicated earlier, the PTP message duration is in the sub-microsecond range. Even assuming a delay variation between the first fronthaul network unit 501 and the second fronthaul network units 520, 540 in the order of 50 μs (which is a reasonable limit in a conventional fronthaul network) and assuming a timing error in the creation of the TDM and time slot allocation by the second fronthaul network units 520, 540 in the order of 50 μs (e.g. due to a coarse PTP synchronization, or frequency accuracy in the order of 1000 ppm, which reasonable could create about a 50 μs-error over 60 ms), it would result still be sufficient to only allocate guard periods between the allocated time slots in the order of about 0.1 ms.

Figure 17:
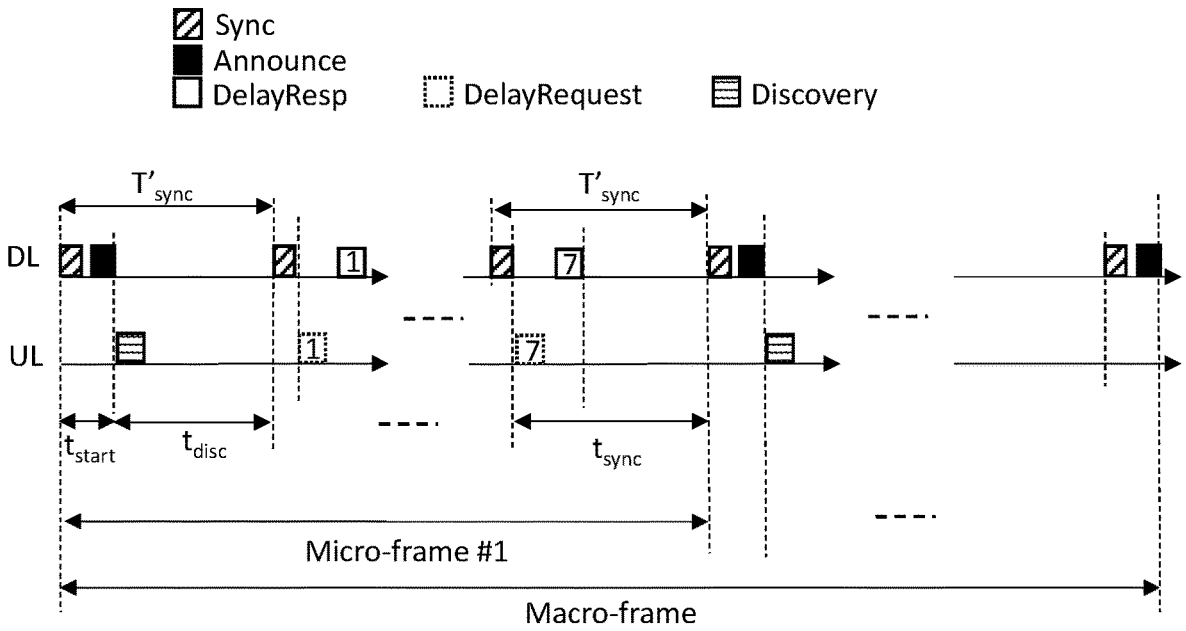

FIG. 17 shows yet another illustrative example of packet-based synchronization messages transmitted in UL and DL between the first fronthaul network unit 501 and the second fronthaul network units 520, 540 in allocated time slots $t_{sync}$ of a transmission time frame $T_{sync}$, $T'_{sync}$. This example shows how an automatic discovery procedure may be performed "in-band" for the second fronthaul network units 520, 540.

Here, it may be seen that the first time slot (0) in a TDM frame may be used to allow for a second fronthaul network unit 520, 540 to transmit a discovery message to the first fronthaul network unit 501. The next seven time slots (1-7) in the next TDM frames are assigned time slots to already known second fronthaul network units 520, 540 in the fronthaul network 500 and used for PTP message exchanges. The first fronthaul network unit 501 may, for example, transmit in the starting time slot, $t_{start}$, a PTP Sync message or PTP announce message, a TLV comprising the size of the hash for the second fronthaul network units 520, 540 to use on its physical port MAC address, e.g. an 8-bit hash, to calculate its identity to be using the discovery message to the first fronthaul network unit 501. For example, an 8-bit hash provides 256 values.

To allow for higher number of second fronthaul network units 520, 540, a TDM frame may here form part of a micro frame as part of a macro frame. In each micro frame, different second fronthaul network units 520, 540 may be discovered and allocated time slots in the TDM frame. For example, in the first micro frame, one new second fronthaul network units 520, 540 may be discovered, while the known second fronthaul network units 520, 540 numbered 1-7 may be allocated time slots in the TDM frame. In the next micro frame, one new second fronthaul network unit 520, 540 may be discovered, while the known second fronthaul network units 520, 540 numbered 8-14 may be allocated time slots in the TDM frame, etc. A number of micro frames may then form a macro-frame, which then starts over with the first macro frame again. For example, the first fronthaul network unit 501 may, for example, transmit the size of the micro frame, the size of the macro frame and the start of the periodic time-interval scheme of the micro- and macro frames in the TLV of a PTP Sync message or PTP announce message in a starting time slot, $t_{start}$.

According to one example, there may be 256 micro-frames in 1 macro-frame. This assumes 16 PTP sync messages per second (i.e. 62.5 ms TDM frames), a hash MAC address to 256 discovery identities, and a micro frame comprising 8 TDM frames (i.e. 8×62.5 ms=500 ms). This will give the macro frame a size of 128 seconds and the first fronthaul network unit 501 the chance to discover 256 new second fronthaul network units 520, 540 in the fronthaul network 500. Also, 256 PTP message exchanges are enabled for known second fronthaul network units 520, 540 in each macro frame.

According to some embodiments, the size of the micro frame, the size of the macro frame and the start of the periodic time-interval scheme of the micro- and macro frames may also be extended in order to allow for more second fronthaul network units 520, 540 in the fronthaul network 500. For example, the first fronthaul network unit 501 may have default N number of time slots in a scheme, 1 for discovery and N-1 to assign to known second fronthaul network units 520, 540 for measurements. When the first fronthaul network unit 501 receives a discovery message from N-2'th known second fronthaul network unit 520, 540, the first fronthaul network unit 501 may prepare to extend the number of time slots in the micro frame. For example, the first fronthaul network unit 501 may extend the Micro-frame to 2N number of time slots, i.e. 2 for discovery and 2N-2 to assign to known second fronthaul network units 520, 540 for measurements. Here, known second fronthaul network units 520, 540 may keep their time slot, while new second fronthaul network units 520, 540 may get the extended time slots. Further, the first fronthaul network unit 501 may, for example, transmit the extended size of the micro frame, the extended size of the macro frame and the new start of the periodic time-interval scheme of the micro- and macro frames in the TLV of a PTP Sync message or PTP announce message in a starting time slot, $t_{start}$.

Figure 18:
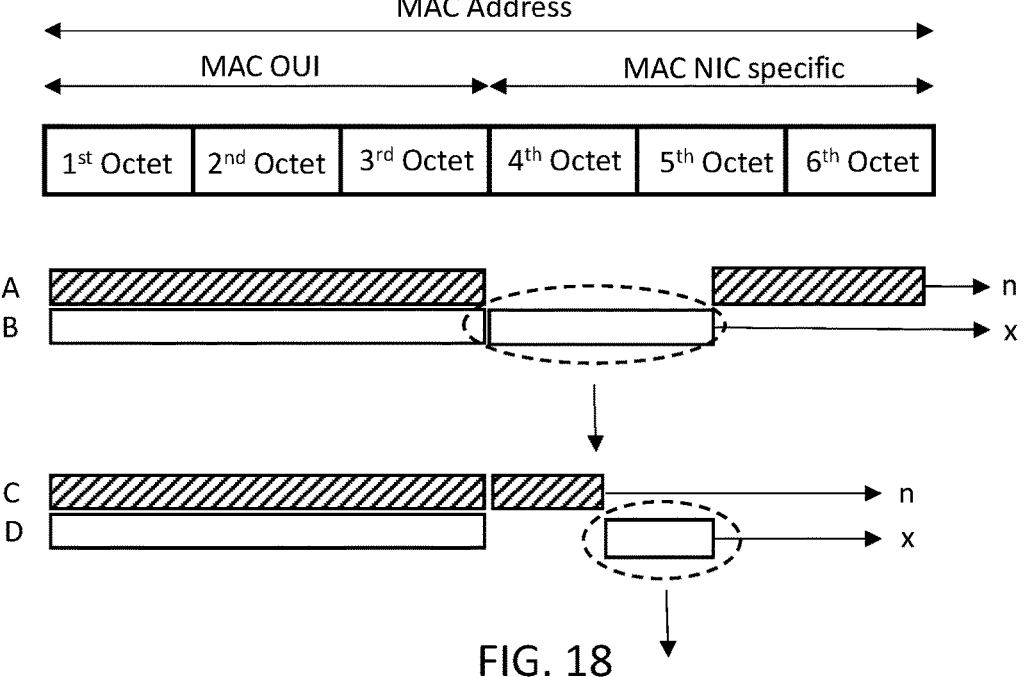
FIG. 18 is a schematic block diagram illustrating conflict resolution according to embodiments of the first and second fronthaul network units.

FIG. 18 shows a schematic block diagram illustrating conflict resolution according to some embodiments of the first fronthaul network unit 501 and the second fronthaul network units 520, 540. This illustrates an automated procedure to resolve unlikely, but possible, conflicts during discovery of second fronthaul network units 520, 540 in the fronthaul network 500. This may occur, for example, when two or more second fronthaul network units 520, 540 ends up with same identity for their discovery message when performing the hash on their MAC address. This procedure may separate these second fronthaul network units 520, 540 based on their full MAC address, and thus allow one or both of them to transmit their discovery message in a different time slot. However, it should be noted that an erroneous message may arrive at the first fronthaul network unit 501 on the dedicated optical wavelength $\lambda_5$, i.e. the common optical sync connection, for other reasons that two or more second fronthaul network units 520, 540 end up with same identity, e.g. a malfunction at one or more of the second fronthaul network units 520, 540 or damaged or broken single optical fiber 510.

First, at the first erroneously received discovery message from the second fronthaul network units 520, 540 in the fronthaul network 500, the first fronthaul network unit 501 may set an error flag, but takes no action. At a consecutive erroneously received discovery message from the second fronthaul network units 520, 540 in the fronthaul network 500, the first fronthaul network unit 501 may determine that two second fronthaul network units 520, 540 have arrived at the same time slot for transmitting their discovery message, e.g. time slot n. The first fronthaul network unit 501 may then a identify a first non-used timeslot in existing scheme so far, e.g. time slot x.

Further, the first fronthaul network unit 501 may transmit in a packet-based synchronization message, e.g. in the TLV of a PTP Sync message or PTP announce message in a starting time slot, $t_{start}$, information addressed to the second fronthaul network units 520, 540 using the erroneous time slot, i.e. time slot n. This means addressing the second fronthaul network units 520, 540 with an identity causing them to transmit in time erroneous time slot, i.e. time slot n. The information may indicate that in case of having a MAC-address OUI+any part of a first half of NIC part (bit 0 up to bit 11), then use time-slot n for discovery. However, the information may also indicate that in case of having a MAC-address OUI+any part of a last half of NIC part (bit 12 up to 23), then use time-slot x for discovery. This is depicted in the upper part of FIG. 18 for second fronthaul network units 520, 540 with MAC addresses A and B.

Furthermore, should the error still persist in timeslot n, then the information may further comprise information to further divide the first half of the NIC part. This means that information may indicate that in case of having a MAC-address OUI+first half of divided first NIC part (bit 0-5), then use time-slot n for discovery. However, the information may also indicate that in case of having a MAC-address OUI+last half of divided first NIC part (bit 6-11), then use time-slot x for discovery. Similarly, in case the error further persists, then the information may further comprise information to further divide the second half of the NIC part. This means that information may indicate that in case of having a MAC-address OUI+first half of divided second NIC part (bit 12-17), then use time-slot n for discovery. However, the information may also indicate that in case of having a MAC-address OUI+last half of divided second NIC part (bit 18-23), then use time-slot x for discovery. This is depicted in the lower part of FIG. 18 for second fronthaul network units 520, 540 with MAC addresses C and D. This may be repeated by the first fronthaul network unit 501 until identities of the second fronthaul network units 520, 540 may be separated and received correctly in their respective discovery message.

Also, in some embodiments, if division is down to only 1 bit in difference and the error still persists, then the first fronthaul network unit 501 may determine that there are is a product or optical fiber error, or that more than two second fronthaul network units 520, 540 has arrived at the same identity. The first fronthaul network unit 501 may then send an alarm to the OAM.

Figure 19:
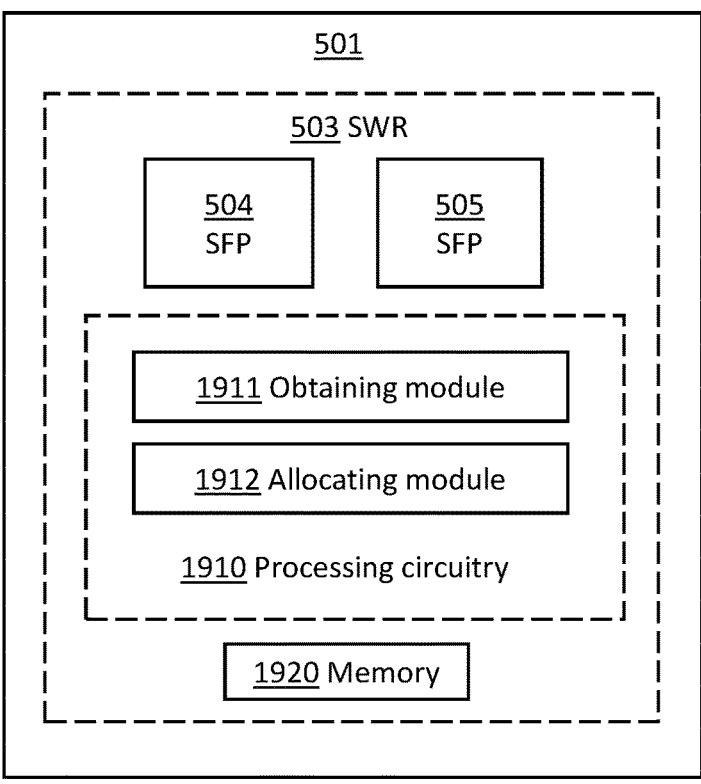
FIG. 19 is a block diagram depicting embodiments of a first fronthaul network unit.

To perform the method actions in a first fronthaul network unit 501 for enabling synchronization with second fronthaul network units 520, 540 over a single optical fiber 510 in a fronthaul network 500, the first fronthaul network unit 501 may comprise the following arrangement depicted in FIG. 19. FIG. 19 shows a schematic block diagram of embodiments of a first fronthaul network unit 501. The embodiments of the first fronthaul network unit 501 described herein may be considered as independent embodiments or may be considered in any combination with each other to describe non-limiting examples of the example embodiments described herein.

The first fronthaul network unit 501 may comprise a switch or router, SWR, 503 comprising a first optical port 504 and a second optical port 505. The first and second optical ports 504, 505 may be provided by optical communication devices, such as, Small Form-factor transceivers or pluggables, SFPs. For the sake of simplicity, no further parts comprised in the first fronthaul network unit 501 as described above with reference to FIGS. 10-12 will be described in more detail hereinafter. The SWR 503 may further comprise processing circuitry 1910 and a memory 1920. The processing circuitry 1910 may be configured to communicate and perform transmissions over the fronthaul network 100, such as, transmitting and receiving payload data for TDD radio transmissions, e.g. RAN or radio data traffic, and transmitting and receiving packet-based synchronization messages, e.g. PTP sync messages. It should also be noted that some or all of the functionality described in the embodiments above as being performed by the first fronthaul network unit 501 may be provided by the processing circuitry 1910 executing instructions stored on a computer-readable medium, such as, e.g. the memory 1920 shown in FIG. 19. Alternative embodiments of the first fronthaul network unit 501 may comprise additional components, such as, for example, an obtaining module 1911 and a allocating module 1912, each responsible for providing its respective functionality necessary to support the embodiments described herein.

The first fronthaul network unit 501, the SWR 503 or processing circuitry 1910 is configured to, or may comprise the obtaining module 1911 configured to, obtain a first transmission time frame $T_{sync}$ for packet-based synchronization messages transmitted on a dedicated optical wavelength $\lambda_5$ over the single optical fiber 510 in the fronthaul network 500. Also, the first fronthaul network unit 501, the SWR 503 or processing circuitry 1910 is configured to, or may comprise the obtaining module 1911 configured to, obtain information indicating an identity of each of the second fronthaul network units 520, 540 in the fronthaul network 500. Further, the first fronthaul network unit 501, the SWR 503 or processing circuitry 1910 is configured to, or may comprise the allocating module 1912 configured to, allocate a time slot $t_{sync}$ for packet-based synchronization messages in a second transmission time frame $T_{sync}$, $T'_{sync}$ to one or more of the second fronthaul network units 520, 540 based on the obtained information. In some embodiments, the first fronthaul network unit 501, the SWR 503 or processing circuitry 1910 is further configured to, via the first optical port 504, transmit information indicating the second transmission time frame $T_{sync}$ and the allocated time slots $t_{sync}$ to the second fronthaul network units 520, 540.

In some embodiments, the first fronthaul network unit 501, the SWR 503 or processing circuitry 1910 may be configured to, or may comprise the allocating module 1912 configured to, determine the second transmission time frame $T_{sync}$, $T'_{sync}$ based on the obtained information. In some embodiments, the second transmission time frame $T_{sync}$, $T'_{sync}$ is determined based on one of more of: a periodicity of packet-based synchronization messages in the fronthaul network 500, a required guard period, and the number of second fronthaul network units 520, 540 in the fronthaul network 500. In some embodiments, the allocation of the time slots $t_{sync}$ for packet-based synchronization messages are based on the number of second fronthaul network units 520, 540 in the fronthaul network 500, and/or on an request from one or more of the second fronthaul network units 520, 540.

In some embodiments, the first fronthaul network unit 501, the SWR 503 or processing circuitry 1910 may be configured to, via the second optical port 505, receive the information indicating an identity of each of the second fronthaul network units 520, 540 from each of the second fronthaul network units 520, 540 over the single optical fiber 510 in the fronthaul network 500 on a separate optical wavelength $\lambda_6$ other than the dedicated optical wavelength $\lambda_5$. Here, according to some embodiments, the first fronthaul network unit 501, the SWR 503 or processing circuitry 1910 may be configured to, via the first optical port 504, perform the transmission of the indicating the second transmission time frame $T_{sync}$ and the allocated time slots $t_{sync}$ over the single optical fiber 510 in the fronthaul network 500 on the separate optical wavelength $\lambda_6$.

In some embodiments, the first fronthaul network unit 501, the SWR 503 or processing circuitry 1910 may be configured to, or may comprise the obtaining module 1911 configured to, receive the information indicating an identity of each of the second fronthaul network units 520, 540 directly via a configuration set in the first fronthaul network unit 501. In some embodiments, the first fronthaul network unit 501, the SWR 503 or processing circuitry 1910 may be configured to, via the first optical port 504, transmit, to each of the second fronthaul network units 520, 540 over the single optical fiber 510 in the fronthaul network 500 on the dedicated optical wavelength $\lambda_5$ or on a separate optical wavelength $\lambda_6$ other than the dedicated optical wavelength $\lambda_5$, information indicating that each of the second fronthaul network units 520, 540 is to transmit the information indicating its identity to the first fronthaul network unit 501 over the single optical fiber 510 in the fronthaul network 500 on the separate optical wavelength $\lambda_6$. In this case, the first fronthaul network unit 501, the SWR 503 or processing circuitry 1910 may also be configured to, via the first optical port 504, transmit an acknowledgment message of the received the information indicating the identity of each of the second fronthaul network units 520, 540 to each of the second fronthaul network units 520, 540 over the single optical fiber 510 in the fronthaul network 500 on the separate optical wavelength $\lambda_6$. Optionally, according to some embodiments, the first fronthaul network unit 501, the SWR 503 or processing circuitry 1910 may be configured to, via the first optical port 504, perform the transmission of the indicating the second transmission time frame $T_{sync}$, $T'_{sync}$ and the allocated time slots $t_{sync}$ is performed over the single optical fiber 510 in the fronthaul network 500 on the dedicated optical wavelength $\lambda_5$ via a packet-based synchronization message.

In some embodiments, the first fronthaul network unit 501, the SWR 503 or processing circuitry 1910 may be configured to, via the first optical port 504, transmit, to each of the second fronthaul network units 520, 540 over the single optical fiber 510 in the fronthaul network 500 on the dedicated optical wavelength $\lambda_5$, information indicating that each of the second fronthaul network units 520, 540 is to transmit the information indicating its identity to the first fronthaul network unit 501 over the single optical fiber 510 in the fronthaul network 500 on the dedicated optical wavelength $\lambda_5$. Here, in some embodiments, the first fronthaul network unit 501, the SWR 503 or processing circuitry 1910 may be configured to, via the first optical port 504, transmit information indicating at least one allocated discovery time slot $t_{disc}$ in the second transmission time frame $T'_{sync}$ for the second fronthaul network units 520, 540 to transmit the information indicating their identities to the first fronthaul network unit 501. In some embodiments, the first fronthaul network unit 501, the SWR 503 or processing circuitry 1910 may be configured to, via the second optical port 505, receive the information indicating an identity of each of the second fronthaul network units 520, 540 from each of the second fronthaul network units 520, 540, respectively, in the at least one allocated discovery time slot $t_{disc}$ of the second transmission time frame $T'_{sync}$ over the single optical fiber 510 in the fronthaul network 500 on the dedicated optical wavelength $\lambda_5$. In some embodiments, the first fronthaul network unit 501, the SWR 503 or processing circuitry 1910 may be configured to, via the first optical port 504, transmit information to be used by each of the second fronthaul network units 520, 540 to determine an identity in the fronthaul network 500, wherein the determined identity indicate which of the allocated discovery time slots $t_{disc}$ to use for transmitting the determined identity to the first fronthaul network unit 501.

In some embodiments, the first fronthaul network unit 501, the SWR 503 or processing circuitry 1910 is configured to, or may comprise the obtaining module 1912 configured to, obtain information indicating that at least two of the second fronthaul network units 520, 540 have determined the same identity in the fronthaul network 500 and are transmitting their determined identities to the first fronthaul network unit 501 in the same allocated discovery time slot $t_{disc}$. Here, in some embodiments, the first fronthaul network unit 501, the SWR 503 or processing circuitry 1910 may be configured to, via the first optical port 504, transmit information to the at least two of the second fronthaul network units 520, 540 indicating to one of the at least two of the second fronthaul network units to transmit the determined identity to the first fronthaul network unit 501 in another one of the allocated discovery time slots $t_{disc}$.

In some embodiments, the first fronthaul network unit 501, the SWR 503 or processing circuitry 1910 is configured to, or may comprise the allocating module 1912 configured to, allocate an starting time slot $t_{start}$ for DL packet-based synchronization messages in the second transmission time frame $T_{sync}$, $T'_{sync}$ to the second fronthaul network units 520, 540. Here, in some embodiments, the first fronthaul network unit 501, the SWR 503 or processing circuitry 1910 may be configured to, via the first optical port 504, transmit, to the second fronthaul network units 520, 540 in the allocated starting time slot $t_{start}$ of the second transmission time frame $T_{sync}$ on the dedicated optical wavelength $\lambda_5$, DL packet-based synchronization messages comprising the information indicating the second transmission time frame $T_{sync}$ and the allocated time slots $t_{sync}$.

In some embodiments, the first fronthaul network unit 501, the SWR 503 or processing circuitry 1910 may be configured to, via the second optical port 505, receive uplink, UL, packet-based synchronization messages from one or more of the second fronthaul network units 520, 540 in the allocated time slots $t_{sync}$ of the second transmission time frame $T_{sync}$, $T'_{sync}$ on the dedicated optical wavelength $\lambda_5$. Here, in response to the received UL packet-based synchronization messages, the first fronthaul network unit 501, the SWR 503 or processing circuitry 1910 may be configured to, via the first optical port 504, transmit downlink, DL, packet-based synchronization messages to the one or more of the second fronthaul network units 520, 540 on the dedicated optical wavelength $\lambda_2$.

Furthermore, the embodiments of the first fronthaul network unit 501 for enabling synchronization with second fronthaul network units 520, 540 over a single optical fiber 510 in a fronthaul network 500 described above may be implemented through one or more processors, such as the processing circuitry 1910 in the SWR 503 in the first fronthaul network unit 501 depicted in FIG. 19, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 1910 in the SWR 503 in the first fronthaul network unit 501 depicted in FIG. 19. The data carrier, or computer readable medium, may be one of an electronic signal, optical signal, radio signal, or computer-readable storage medium. The computer program code may e.g. be provided as pure program code in the first fronthaul network unit 501 or on a server and downloaded to the first fronthaul network unit 501. Thus, it should be noted that the modules of the first fronthaul network unit 501, may in some embodiments be implemented as computer programs stored in memory, e.g. in the memory modules 1920 in FIG. 19, for execution by processors or processing modules, e.g. the processing circuitry 1910 in the SWR 503 in the first fronthaul network unit 501 depicted in FIG. 19.

Those skilled in the art will also appreciate that the processing circuitry 1910 and the memory 1920 described above may refer to a combination of analog and digital circuits, and/or one or more processors configured with software and/or firmware, e.g. stored in a memory, that when executed by the one or more processors such as the processing circuitry 1920 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 20:
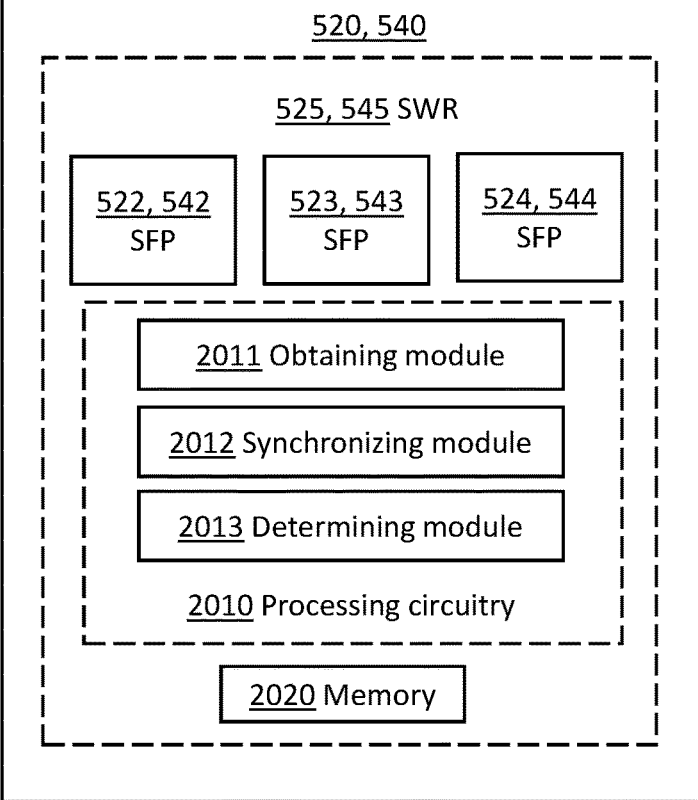
FIG. 20 is a block diagram depicting embodiments of a second fronthaul network unit.

To perform the method actions in a second fronthaul network unit 520, 540 for synchronization with a first fronthaul network unit 501 over a single optical fiber 510 in a fronthaul network 500, the second fronthaul network unit 520, 540 may comprise the following arrangement depicted in FIG. 20. FIG. 20 shows a schematic block diagram of embodiments of a second fronthaul network unit 520, 540. The embodiments of the second fronthaul network unit 520, 540 described herein may be considered as independent embodiments or may be considered in any combination with each other to describe non-limiting examples of the example embodiments described herein.

The second fronthaul network unit 520, 540 may comprise a switch or router, SWR, 525, 545 comprising a first optical port 522, 542, a second optical port 523, 543, and a third optical port 524, 544. The first, second and third optical ports 522, 542, 523, 543, 524, 544 may be provided by optical communication devices, such as, Small Form-factor transceivers or pluggables, SFPs. For the sake of simplicity, no further parts comprised in the second fronthaul network unit 520, 540 as described above with reference to FIGS. 6-9, 11 will be described in more detail hereinafter. The SWR 525, 545 may further comprise processing circuitry 2010 and a memory 2020. The processing circuitry 1910 may be configured to communicate and perform transmissions over the fronthaul network 100, such as, transmitting and receiving payload data for TDD radio transmissions, e.g. RAN or radio data traffic, and transmitting and receiving packet-based synchronization messages, e.g. PTP sync messages. It should also be noted that some or all of the functionality described in the embodiments above as being performed by the second fronthaul network unit 520, 540 may be provided by the processing circuitry 2010 executing instructions stored on a computer-readable medium, such as, e.g. the memory 2020 shown in FIG. 20. Alternative embodiments of the second fronthaul network unit 520, 540 may comprise additional components, such as, for example, an obtaining module 2011, a synchronizing module 2012, and a determining module 2013, each responsible for providing its respective functionality necessary to support the embodiments described herein.

The second fronthaul network unit 520, 540, the SWR 525, 545 or processing circuitry 2010 is configured to, or may comprise the obtaining module 2011 configured to, obtain information indicating a transmission time frame $T_{sync}$, $T'_{sync}$ for packet-based synchronization messages transmitted on a dedicated optical wavelength $\lambda_5$ over the single optical fiber 510 in the fronthaul network 500, and information indicating a time slot $t_{sync}$ in the transmission time frame $T_{sync}$, $T'_{sync}$ allocated to the second fronthaul network unit 520, 540 for transmitting packet-based synchronization messages to the first fronthaul network unit 501 on the dedicated optical wavelength $\lambda_5$ over the single optical fiber 510 in the fronthaul network 500. Also, the second fronthaul network unit 520, 540, the SWR 525, 545 or processing circuitry 2010 is configured to, or may comprise the obtaining module 2011 and/or the first optical port 522, 542 configured to, transmit, to the first fronthaul network unit 501, an uplink, UL, synchronization message in the time slot $t_{sync}$ in the transmission time frame $T_{sync}$, $T'_{sync}$ allocated to the second fronthaul network unit 520, 540 over the single optical fiber 510 in the fronthaul network 500 on the dedicated optical wavelength $\lambda_5$.

In some embodiments, the second fronthaul network unit 520, 540, the SWR 525, 545 or processing circuitry 2010 is configured to, or may comprise the obtaining module 2011 configured to, receive the information indicating the transmission time frame $T_{sync}$, $T'_{sync}$ and the time slot $t_{sync}$ directly via a configuration set in the second fronthaul network unit 520, 540. Alternatively, in some embodiments, the second fronthaul network unit 520, 540, the SWR 525, 545 or processing circuitry 2010 may be configured to, or may comprise the obtaining module 2011 and/or the first optical port 522, 542 configured to, receive the information indicating the transmission time frame $T_{sync}$, $T'_{sync}$ and the time slot $t_{sync}$ over the single optical fiber 510 in the fronthaul network 500 on a separate optical wavelength $\lambda_6$ than the dedicated optical wavelength $\lambda_5$. According to another alternative, in some embodiments, the second fronthaul network unit 520, 540, the SWR 525, 545 or processing circuitry 2010 may be configured to, or may comprise the obtaining module 2011 and/or the second optical port 523, 543 configured to, receive the information indicating the transmission time frame $T_{sync}$, $T'_{sync}$ and the time slot $t_{sync}$ over the single optical fiber 510 in the fronthaul network 500 on the dedicated optical wavelength $\lambda_5$ via a packet-based synchronization message.

According to some embodiments, the second fronthaul network unit 520, 540, the SWR 525, 545 or processing circuitry 2010 may be configured to, or may comprise the obtaining module 2011 and/or the first optical port 522, 542 configured to, receive, from the first fronthaul network unit 501 over the single optical fiber 510 in the fronthaul network 500 on the dedicated optical wavelength $\lambda_5$, information indicating that the second fronthaul network unit 520, 540 is to transmit the information indicating its identity to the first fronthaul network unit 501 over the single optical fiber 510 in the fronthaul network 500 on the separate optical wavelength $\lambda_6$. Here, in some embodiments, the second fronthaul network unit 520, 540, the SWR 525, 545 or processing circuitry 2010 may be configured to, via the first optical port 522, 542, transmit information indicating an identity of the second fronthaul network unit 520, 540 to first fronthaul network unit 501 over the single optical fiber 510 in the fronthaul network 500 on a separate optical wavelength $\lambda_6$ than the dedicated optical wavelength $\lambda_5$. Also, in some embodiments, the second fronthaul network unit 520, 540, the SWR 525, 545 or processing circuitry 2010 may be configured to, or may comprise the obtaining module 2011 and/or the first optical port 522, 542 configured to, receive an acknowledgement message of the transmitted information indicating the identity of the second fronthaul network units 520, 540 to first fronthaul network unit 501 over the single optical fiber 510 in the fronthaul network 500 on the separate optical wavelength $\lambda_6$.

In some embodiments, the second fronthaul network unit 520, 540, the SWR 525, 545 or processing circuitry 2010 may be configured to, or may comprise the obtaining module 2011 and/or the second optical port 523, 543 configured to, receive, from the first fronthaul network unit 501 over the single optical fiber 510 in the fronthaul network 500 on the dedicated optical wavelength $\lambda_5$, information indicating that the second fronthaul network unit 520, 540 is to transmit the information indicating its identity to the first fronthaul network unit 501 over the single optical fiber 510 in the fronthaul network 500 on the dedicated optical wavelength $\lambda_5$, and information indicating at least one discovery time slot $t_{disc}$ in the transmission time frame $T_{sync}$, $T'_{sync}$ allocated to the second fronthaul network unit 520, 540 to transmit the information indicating its identity to the first fronthaul network unit 501. In some embodiments, the second fronthaul network unit 520, 540, the SWR 525, 545 or processing circuitry 2010 may also be configured to, or may comprise the obtaining module 2011 and/or the second optical port 523, 543 configured to, transmit, to the first fronthaul network unit 501, the information indicating the identity of the second fronthaul network unit 520, 540 in the allocated discovery time slot $t_{disc}$ of the transmission time frame $T_{sync}$, $T'_{sync}$ over the single optical fiber 510 in the fronthaul network 500 on the dedicated optical wavelength $\lambda_5$.

In some embodiments, the second fronthaul network unit 520, 540, the SWR 525, 545 or processing circuitry 2010 may be configured to, or may comprise the obtaining module 2011 configured to, receive information to be used by the second fronthaul network unit 520, 540 in order to determine an identity in the fronthaul network 500, wherein the determined identity further indicate which of the allocated discovery time slots $t_{disc}$ to use for transmitting the determined identity to the first fronthaul network unit 501. Here, in some embodiments, the second fronthaul network unit 520, 540, the SWR 525, 545 or processing circuitry 2010 may be configured to, or may comprise the determining module 2013 configured to, determine an identity of the second fronthaul network unit 520, 540 in the fronthaul network 500 based on the received information.

In some embodiments, the second fronthaul network unit 520, 540, the SWR 525, 545 or processing circuitry 2010 may be configured to, or may comprise the obtaining module 2011 and/or the second optical port 523, 543 configured to, receive information from the first fronthaul network unit 501 indicating that the second fronthaul network unit 520, 540 is to transmit the determined identity to the first fronthaul network unit 501 in another allocated discovery time slot $t_{disc}$ than the allocated discovery time slot $t_{disc}$ indicated by the determined identity. Here, in some embodiments, the second fronthaul network unit 520, 540, the SWR 525, 545 or processing circuitry 2010 may be configured to, or may comprise the obtaining module 2011 and/or the second optical port 523, 543 configured to, transmit the determined identity to the first fronthaul network unit 501 based on the received information.

In some embodiments, the second fronthaul network unit 520, 540, the SWR 525, 545 or processing circuitry 2010 may be configured to, or may comprise the obtaining module 2011 and/or the second optical port 523, 543 configured to, receive, from the first fronthaul network unit 501 in a starting time slot $t_{start}$ of the transmission time frame $T_{sync}$, $T'_{sync}$ over the single optical fiber 510 in the fronthaul network 500 on the dedicated optical wavelength $\lambda_5$, downlink, DL, packet-based synchronization messages comprising the information indicating the transmission time frame $T_{sync}$, $T'_{sync}$ and the time slot $t_{sync}$.

In some embodiments, the second fronthaul network unit 520, 540, the SWR 525, 545 or processing circuitry 2010 may be configured to, or may comprise the obtaining module 2011 and/or the second optical port 523, 543 configured to, receive from the first fronthaul network unit 501, in response to the transmitted UL packet-based synchronization message, DL packet-based synchronization messages over the single optical fiber 510 in the fronthaul network 500 on the dedicated optical wavelength $\lambda_5$. Here, in some embodiments, the second fronthaul network unit 520, 540, the SWR 525, 545 or processing circuitry 2010 may be configured to, or may comprise the synchronizing module 2012 configured to, synchronize time and/or frequency information in the second fronthaul network unit 520, 540 based on the packet-based synchronization messages.

Furthermore, the embodiments of a second fronthaul network unit 520, 540 for synchronization with a first fronthaul network unit 501 over a single optical fiber 510 in a fronthaul network 500 described above may be implemented through one or more processors, such as, the processing circuitry 2010 in the SWR 525, 545 in the second fronthaul network unit 520, 540 depicted in FIG. 20, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 2010 in the SWR 525, 545 in the second fronthaul network unit 520, 540 depicted in FIG. 20. The data carrier, or computer readable medium, may be one of an electronic signal, optical signal, radio signal, or computer-readable storage medium. The computer program code may e.g. be provided as pure program code in the second fronthaul network unit 520, 540 or on a server and downloaded to the second fronthaul network unit 520, 540. Thus, it should be noted that the modules of the second fronthaul network unit 520, 540 may in some embodiments be implemented as computer programs stored in memory, e.g. in the memory modules 2020 in FIG. 20, for execution by processors or processing modules, e.g. the processing circuitry 2010 in the SWR 525, 545 in the second fronthaul network unit 520, 540 depicted in FIG. 20.

Those skilled in the art will also appreciate that the processing circuitry 2010 and the memory 2020 described above may refer to a combination of analog and digital circuits, and/or one or more processors configured with software and/or firmware, e.g. stored in a memory, that when executed by the one or more processors such as the processing circuitry 2020 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

ABBREVIATIONS

CPRI Common Public Radio Interface
DL Downlink
eCPRI Enhanced CPRI
GM Grand Master
GNSS Global Navigation Satellite System
GPS Global Positioning System
PDV Packet Delay Variation
RAN Radio Access Network
RF Radio Frequency
RRU Remote Radio Unit
RTC Real-time Clock
RU Radio Unit
BB Baseband
FPGA Field Programmable Grid Array
GM Grand Master
GPON Gigabit-capable Passive Optical Network
GPS Global Positioning System
LASER Light Amplification by Stimulated Emission of Radiation
NTP Network Time Protocol
OAM Operations Administration and Management
OLT/ONT Optical Line Terminal/Optical Network Terminal
ONU Optical Network Unit
O-RAN Open RAN
OSS Operation Systems Support
PON Passive Optical Network
POTS Plain Old Telephone Service
PTP Precision Time Protocol
RAN Radio Access Network
SC Slave Clock
SFP Small Form-factor Pluggable or Small Form Factor transceiver
SWR Switch or Router
SyncE Synchronous Ethernet
TLV Type Length Value
UL Uplink
OTDOA Observed Time Difference of Arrival
TAE Timing Alignment Error
RRH Remote Radio Head
OUI Organizationally Unique Identifier
MAC Media Access Control
TDM Time Division Multiplexed
DRAN Distributed RAN

The invention claimed is:

1. A method performed by a second fronthaul network unit for enabling synchronization with a first fronthaul network unit over a first single optical fiber in a fronthaul network, the method comprising:

receiving a first optical signal on the first single optical fiber;

separating the received first optical signal into a second optical signal carrying downlink (DL) radio data traffic having a first optical wavelength and a third optical signal carrying packet-based synchronization messages having a second optical wavelength, wherein the second optical wavelength is different from the first optical wavelength;

outputting the separated second optical signal towards a first optical port in the second fronthaul network unit;

splitting the separated third optical signal towards a second optical port in the second fronthaul network unit;

receiving DL radio data traffic in the separated second optical signal via the first optical port, and packet-based synchronization messages in the separated third optical signal via the second optical port;

transmitting DL radio data traffic not intended for the second fronthaul network unit using a third optical port that outputs a fourth optical signal having a third optical wavelength; and multiplexing the fourth optical signal from the third optical port and the separated third optical signal onto a second single optical fiber.

2. The method according to claim 1, further comprising receiving a fifth optical signal on the second single optical fiber;

separating the received fifth optical signal into a sixth optical signal carrying uplink (UL) radio data traffic having a fourth optical wavelength and a seventh optical signal carrying packet-based synchronization messages having a fifth optical wavelength, wherein the fourth optical wavelength is different from the fifth optical wavelength; and outputting the separated sixth optical signal towards the third optical port in the second fronthaul network unit.

3. The method according to claim 2, further comprising transmitting uplink (UL) radio data traffic to the first fronthaul network unit using the first optical port that outputs a ninth optical signal having a sixth optical wavelength.

4. The method according to claim 3, further comprising transmitting packet-based synchronization messages to the first fronthaul network unit using the second optical port that outputs an eighth optical signal having the fifth optical wavelength, wherein the fifth optical wavelength is different from the sixth optical wavelength; and multiplexing the ninth optical signal from the first optical port and the eighth optical signal from the second optical port onto the first single optical fiber towards the first fronthaul network unit.

5. The method according to claim 4, further comprising multiplexing the ninth optical signal from the first optical port and the separated seventh optical signal onto the first single optical fiber towards the first fronthaul network unit.

6. The method according to claim 2, wherein the second optical wavelength is the same wavelength as the fifth optical wavelength, and wherein the first optical wavelength is the same wavelength as one or more of the third optical wavelength, the fourth optical wavelength, and the sixth optical wavelength.

7. The method according to claim 2, wherein the fifth optical wavelength is an optical wavelength that is dedicated to and uniquely emitted by the second fronthaul network unit in the fronthaul network.

8. A second fronthaul network unit for enabling synchronization with a first fronthaul network unit over a first single optical fiber in a fronthaul network, the second fronthaul network unit being configured to:

receive a first optical signal on the first single optical fiber, separate the received first optical signal into a second optical signal carrying downlink (DL) radio data traffic having a first optical wavelength and a third optical signal carrying packet-based synchronization messages having a second optical wavelength, wherein the second optical wavelength is different from the first optical wavelength, output the separated second optical signal towards a first optical port in the second fronthaul network unit, split the separated third optical signal towards a second optical port in the second fronthaul network unit, receive DL radio data traffic in the separated second optical signal via the first optical port, and packet-based synchronization messages in the separated third optical signal via the second optical port, transmit DL radio data traffic not intended for the second fronthaul network unit using a third optical port that outputs a fourth optical signal having a third optical wavelength, and multiplex the fourth optical signal from the third optical port and the separated third optical signal onto a second single optical fiber.

9. The second fronthaul network unit according to claim 8, comprising:

an RF processing unit of a wireless communications network, a switch or router comprising the first optical port, the second optical port, and the third optical port;

a first and a second passive optical filter; and an optical splitter.

10. The second fronthaul network unit according to claim 8, further configured to receive a fifth optical signal on the second single optical fiber, separate the received fifth optical signal into a sixth optical signal carrying uplink (UL) radio data traffic having a fourth optical wavelength and a seventh optical signal carrying packet-based synchronization messages having a fifth optical wavelength, wherein the fourth optical wavelength is different from the fifth optical wavelength, and output the separated sixth optical signal towards the third optical port in the second fronthaul network unit.

11. The second fronthaul network unit according to claim 10, further configured to transmit uplink (UL) radio data traffic to the first fronthaul network unit using the first optical port that outputs a ninth optical signal having a sixth optical wavelength.

12. The second fronthaul network unit according to claim 11, further configured to transmit packet-based synchronization messages to the first fronthaul network unit using the second optical port that outputs an eighth optical signal having the fifth optical wavelength, wherein the fifth optical wavelength is different from the sixth optical wavelength, and multiplex the ninth optical signal from the first optical port and the eighth optical signal from the second optical port onto the first single optical fiber towards the first fronthaul network unit.

13. The second fronthaul network unit according to claim 11, further configured to multiplex the ninth optical signal from the first optical port and the separated seventh optical signal onto the first single optical fiber towards the first fronthaul network unit.

14. The second fronthaul network unit according to claim 10, wherein the second optical wavelength is the same wavelength as the fifth optical wavelength, and wherein the first optical wavelength is the same wavelength as one or more of the third optical wavelength, the fourth optical wavelength, and the sixth optical wavelength.

15. The second fronthaul network unit according to claim 10, wherein the fifth optical wavelength is an optical wavelength that is dedicated to and uniquely emitted by the second fronthaul network unit in the fronthaul network.

16. A method performed by a first fronthaul network unit 5 for enabling synchronization with at least two second fronthaul network units over a first single optical fiber in a fronthaul network, the method comprising:

transmitting downlink (DL) radio data traffic intended for one or more of the at least two second fronthaul 10 network units using a first optical port that outputs a first optical signal having a first optical wavelength;

transmitting packet-based synchronization messages to the at least two second fronthaul network units using a second optical port that outputs a second optical signal 15 having a second optical wavelength, wherein the second optical wavelength is different from the first optical wavelength;

multiplexing the first optical signal from the first optical port and the second optical signal from the second 20 optical port onto the same single optical fiber towards the at least two second fronthaul network units; and allocating a respective uplink time slot to each of the at least two second fronthaul network units for transmitting uplink synchronization messages on the second 25 optical wavelength.

\* \* \* \* \*